United States Patent
Zhou

(10) Patent No.: US 10,261,913 B2
(45) Date of Patent: Apr. 16, 2019

(54) PERSISTENT MEMORY FOR KEY-VALUE STORAGE

(71) Applicant: Alibaba Group Holding Limited, George Town (KY)

(72) Inventor: Ping Zhou, Folsom, CA (US)

(73) Assignee: Alibaba Group Holding Limited (KY)

( * ) Notice: Subject to any disclaimer, the term of this patent is extended or adjusted under 35 U.S.C. 154(b) by 39 days.

(21) Appl. No.: 15/492,776

(22) Filed: Apr. 20, 2017

(65) Prior Publication Data

US 2018/0307620 A1    Oct. 25, 2018

(51) Int. Cl.
| | | |
|---|---|---|
| G06F 12/10 | (2016.01) | |
| G06F 12/1018 | (2016.01) | |
| G06F 3/06 | (2006.01) | |
| G06F 12/14 | (2006.01) | |
| G06F 12/02 | (2006.01) | |

(52) U.S. Cl.
CPC .......... G06F 12/1018 (2013.01); G06F 3/065 (2013.01); G06F 3/0619 (2013.01); G06F 3/0659 (2013.01); G06F 3/0679 (2013.01); G06F 12/0253 (2013.01); G06F 12/1466 (2013.01); *G06F 2212/1052* (2013.01); *G06F 2212/7201* (2013.01); *G06F 2212/7205* (2013.01)

(58) Field of Classification Search
CPC .. G06F 12/1018; G06F 3/0679; G06F 3/0659; G06F 12/1466; G06F 12/0253; G06F 3/0619; G06F 12/02; G06F 12/14; G06F 3/06
USPC .................................................. 711/112, 103
See application file for complete search history.

(56) References Cited

U.S. PATENT DOCUMENTS

| | | | | |
|---|---|---|---|---|
| 8,499,121 | B2* | 7/2013 | Tolia ................. | G06F 12/0871 711/103 |
| 9,075,710 | B2* | 7/2015 | Talagala ............ | G06F 12/0246 |
| 9,740,633 | B2* | 8/2017 | Chiu .................. | G06F 12/1027 |
| 2003/0191739 | A1 | 10/2003 | Chatterjee | |
| 2008/0208938 | A1 | 8/2008 | Lin | |
| 2009/0307373 | A1 | 12/2009 | Cardone | |
| 2010/0106754 | A1 | 4/2010 | Condit | |
| 2013/0046949 | A1 | 2/2013 | Colgrove | |
| 2013/0054869 | A1* | 2/2013 | Tolia ................. | G06F 12/0871 711/102 |
| 2013/0103729 | A1 | 4/2013 | Cooney | |
| 2013/0275656 | A1 | 10/2013 | Talagala | |
| 2014/0310302 | A1 | 10/2014 | Wu | |

(Continued)

OTHER PUBLICATIONS

Jenkins, Hash Functions, Dr. Dobb's Journal, Sep. 1997, http://collaboration.cmc.ec.gc.ca/science/rpn/biblio/ddj/Website/articles/DDJ/1997/9709/9709n/9709n.htm.

*Primary Examiner* — Pierre Miche Bataille
(74) *Attorney, Agent, or Firm* — Van Pelt, Yi & James LLP

(57) ABSTRACT

Using persistent memory for key-value storage is disclosed, including: receiving a put key operation including a key and a corresponding value; directly storing the key at a persistent memory media using a physical address that is determined based at least in part on the key, wherein the persistent memory media supports memory persistence and in-place updating; directly storing the value to the persistent memory media; receiving a get key operation including the key; and directly accessing the persistent memory media using the physical address that is determined based at least in part on the key to retrieve the value corresponding to the key.

21 Claims, 21 Drawing Sheets

(56) References Cited

U.S. PATENT DOCUMENTS

2015/0286579 A1 10/2015 Iliadis
2016/0350324 A1* 12/2016 Wang ................ G06F 17/30156
2018/0011852 A1* 1/2018 Bennett ............... G06F 17/3033

* cited by examiner

| Key | Value |
|---|---|
| Key1 | 111, 222, 333 |
| Key2 | ABC, DEF, 123 |
| Key3 | ZZZ, YYY |
| Key4 | AAA, 3, 9/12/2016 |

FIG. 1

| |
|---|
| Page type field |
| Version number of the value page chain |
| Pointer to next value page in chain |
| Pointer to previous version of value page chain |
| Back pointer |

FIG. 6B

| |
|---|
| Page type field |
| Pointer to current value page chain |
| Snapshot count |
| Delete flag |
| Statistical Information |

FIG. 6A

Marked as unused

PERSISTENT MEMORY FOR KEY-VALUE STORAGE

BACKGROUND OF THE INVENTION

Existing key-value databases running on traditional memory/storage hierarchies suffer from significant inefficiencies. For example, a traditional memory/story hierarchy includes a combination of Dynamic Random Access Memory (DRAM) and Solid State Drive (SSD) and/or Hard Disk Drive (HDD). Key-value data from an application goes through a long path before it arrives at the storage media, and each access incurs multiple disk I/Os.

In some example processes of storing key-value data in traditional memory/storage hierarchies, key-value records are first stored in a memory data structure before they are written to disk files through a "compaction" process. To improve response time, disk files are organized into multiple levels (e.g., level-0 through level-3) with different sizes, with most frequent (and recent) used records stored in level-0 initially. When the files of a level fill up, their data is moved to the next level also through the compaction process. As such, a look up of a key could involve reading multiple files across several levels. Furthermore, some data is duplicated between multiple levels and therefore wastes some of the storage space. Due to these issues, the traditional key-value storing technique suffers from high overhead, high read/write amplification, and space amplification (wasted space).

BRIEF DESCRIPTION OF THE DRAWINGS

Various embodiments of the invention are disclosed in the following detailed description and the accompanying drawings.

FIG. 1 is a diagram showing various example pairs of key-values stored in a key-value database.

FIG. 6A shows example metadata that is stored for a key page.

FIG. 6B shows example metadata that is stored for a value page.

DETAILED DESCRIPTION

Figure 2:
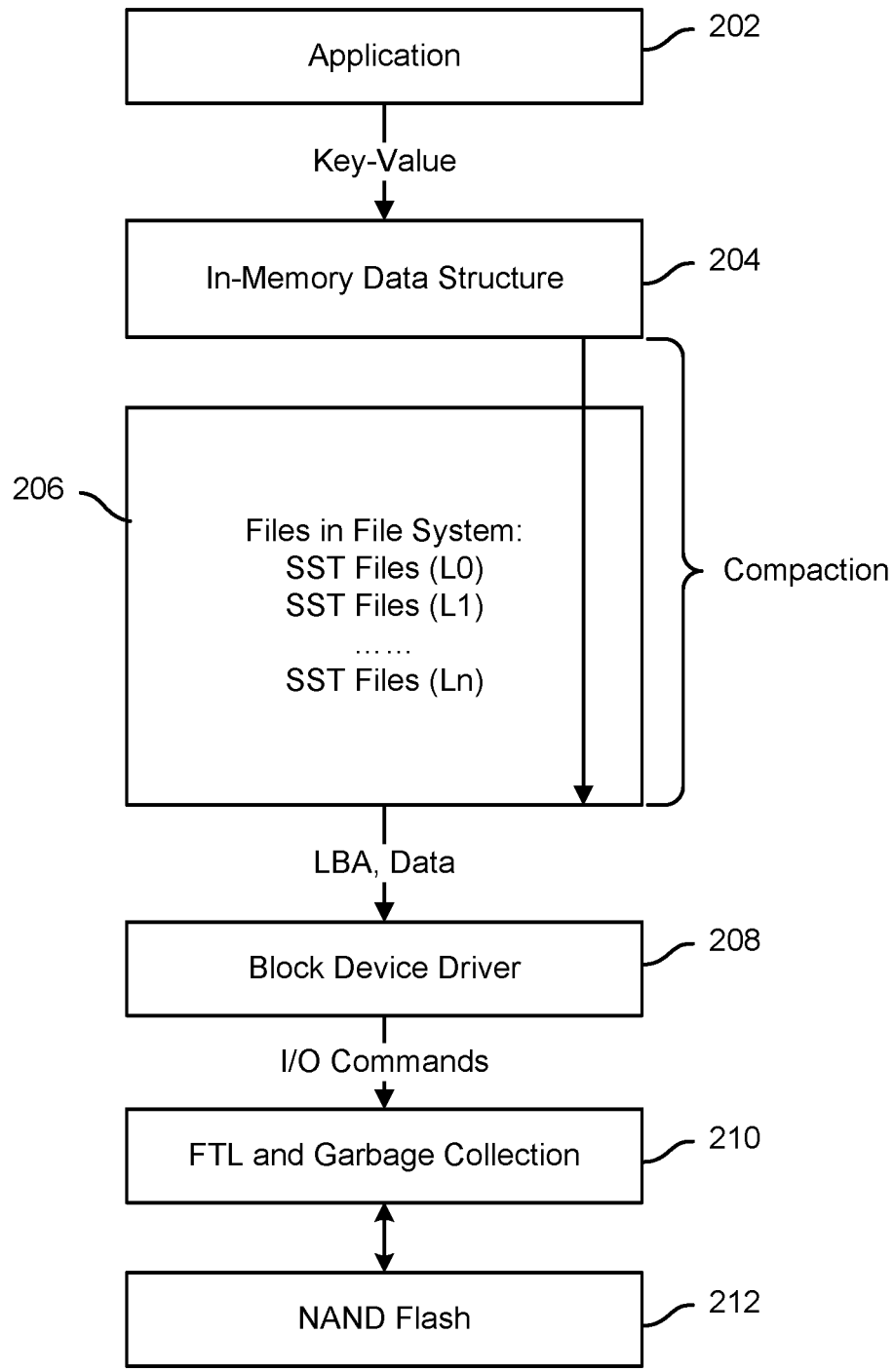
FIG. 2 is a diagram showing a conventional key-value storage scheme.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a diagram showing various example pairs of key-values stored in a key-value database. Key-values may be stored by a key-value database. Examples of key-value database software include NoSQL databases such as Redis® and RocksDB®. Each value object is stored corresponding to a key and the value object may be retrieved from the database using the key that uniquely identifies that object. Referring to the key-value pairs shown in FIG. 1, the key "Key1" may be used to obtain the value "111, 222, 333." Similarly, the key "Key2" may be used to obtain the value "ABC, DEF, 123," and so forth.

Key-value storage is widely used in cloud computing, web applications, and enterprise applications. For example, key-value storage may be used by backend storage engines for other types of storage. Key-value storage may be used to store the metadata of items, for example. In a specific example, a key could be the International Standard Book Number (ISBN) of a book and the corresponding value may include the author of the book, the title of the book, and the publisher of the book. Numerous other uses exist.

FIG. 2 is a diagram showing a conventional key-value storage scheme. As will be described below, in the conventional key-value storage scheme, the key-value data that is sent from application 202 goes through a long path before it arrives at the storage media (NAND flash 212) and each access for a value corresponding to a key incurs multiple disk I/Os.

Take RocksDB® as an example: a key-value pair sent from application 202 to be stored at NAND flash 212 is first stored in in-memory data structure 204 and is written to various levels of files within files in file system 206 in a compaction process. In the example of FIG. 2, the key-value data is first written to Static Sorted Table (SST) Files at Level-0. When the Level-0 SST files fill up, the key-value data is compacted into (larger) Level-1 SST files, and so on and so forth. Due to key-value data being stored across different levels, a look up of a value corresponding to a key may involve multiple reads from files across several levels.

Once the key-value data fills up the last level of SST files, they are converted into regular disk I/Os by using block device driver 208 to translate a Logical Block Address (LBA) of a set of key-value data to a corresponding Physical Block Address (PBA) in NAND flash 212. As such, Flash Translation Layer (FTL) and garbage collection 210 is configured to maintain a large logical-to-physical mapping table internally. For example, Flash Translation Layer (FTL) and garbage collection 210 may be configured as separate FTL and garbage collection modules. The I/O commands will go through several firmware modules such as FTL and garbage collection 210 before being written to NAND flash 212.

Due to these inefficiencies along the I/O path as described with FIG. 2, conventional SSD-based key-value storage suffers from high overhead and significant read/write amplification. And since some data is duplicated between multiple levels of SST files, some of the storage space is wasted.

Furthermore, additional properties of NAND flash storage (e.g., NAND flash 212) cause reads and writes to the NAND flash storage to be inefficient. The first of such inefficiencies is due to the NAND flash storage's inability to perform overwriting of a previously written page (i.e., an in-place update). Because NAND flash memory does not support in-place updates, data can only be written to erased pages. Due to these limitations, data on flash-based SSD is indirect. Indirect data means that an LBA received from a host computer must first be mapped to a corresponding PBA on the drive. The storage controller uses an FTL to manage this LBA→PBA mapping. As such, the FTL needs to maintain a logical-to-physical mapping table in FTL in order to serve read commands from the host computer. As the capacity of a NAND flash storage increases, the size of the logical-to-physical mapping table also increases. For example, 1 TB of user capacity typically requires 1 GB of DRAM to hold the logical-to-physical mapping table. This is challenging to the NAND flash storage as the usage of the logical-to-physical mapping table increases both power consumption and cost.

Another inefficiency of NAND flash storage is the requirement that data only be written to erased pages. In NAND flash storage, data can only be written to "clean" (i.e., erased) pages. Data in NAND flash memory is read or written in units of pages (typically 4 KB large). Pages are erased in units of Erase Block (EB), which is typically 128 KB or 256 KB. If an EB contains useful data, it must be relocated before the EB is erased in order to avoid any data loss. When serving a write command from the host computer, the storage controller always writes data to "clean" (erased) pages and marks overwritten pages as "invalid" in FTL. This process continuously consumes clean pages. Therefore, the storage controller must reclaim space occupied by invalid pages in the background so that the drive will not run out of clean pages. This background process is called "garbage collection" (GC). During a typical GC operation, the storage controller picks a few EBs, moves all valid pages in them to clean pages, and then erases these original EBs to produce clean pages. The GC process is also responsible for distributing P/E cycles across drive capacity in order to achieve the expected life time of the NAND flash storage and to avoid wearing out some pages too early.

Persistent memory's combination of memory and storage characteristics has opened new opportunities in software/hardware optimization, enabling new usage scenarios such as in-memory database, in-memory computation, and fast failure recovery. Persistent memory has properties that avoid some of the inefficiencies that are associated with the conventional SSD-based key-value storage. Embodiments of using persistent memory for key-value storage are described herein. In various embodiments, key-value storage is implemented at a persistent memory. In various embodiments, "persistent memory" refers to a type of storage that has low latency, high endurance, supports in-place updates, serves random accesses (with similar performance as sequential accesses), and is non-volatile (e.g., data stored on the persistent memory will not be lost in the event that the computing device with which it is associated is shut down). As such, persistent memory provides benefits of both memory and permanent storage. Examples of persistent memory media include Phase Change Memory, ReRAM, and STT-RAM. As will be described in further detail below, in various embodiments, using persistent memory for key-value storage allows for in-place updates of a key-value pair and also directs access to the persistent memory.

Figure 3:
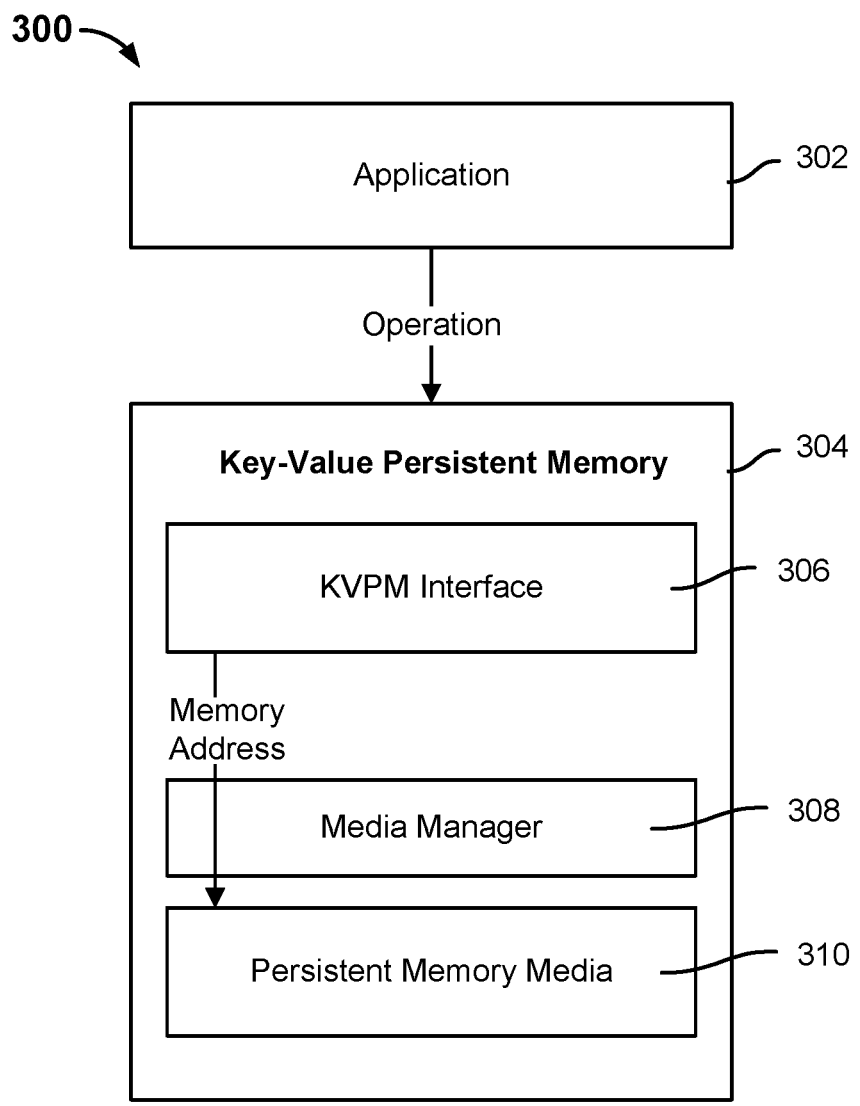
FIG. 3 is a diagram of an embodiment of a system for a persistent memory for key-value storage.

FIG. 3 is a diagram of an embodiment of a system with a persistent memory for key-value storage. In the example, application 302 (e.g., RocksDB®) is configured to provide a key-value store operation to key-value persistent memory (KVPM) 304. In various embodiments, a key-value store operation provided by application 302 comprises a "put key" operation that is associated with storing a given key-value pair, a "get key" operation that is associated with requesting a corresponding value for a given key, or any other appropriate operation for accessing or modifying a key-value pair. In some embodiments, a put key operation may be used to store a new key-value pair or update a new value for a previously stored key.

The key-value store operation sent by application 302 is received at KVPM interface 306 of KVPM 304. In various embodiments, KVPM interface 306 is configured to determine a physical address associated with a page within persistent memory media 310 based on a given key of the received (e.g., put key or get key) operation from application 302. In some embodiments, KVPM interface 306 maps the given key of the operation to a physical address associated with a page within persistent memory media 310. For example, persistent memory media 310 comprises Phase Change Memory, ReRAM, and/or SST-RAM. For example, KVPM interface 306 may be implemented using hardware that is running software and/or firmware, as an application-specific integrated circuit (ASIC), as software, or another appropriate device executing KVPM code. The physical address associated with a page within persistent memory media 310 to which KVPM interface 306 had mapped the given key is a page at which the key associated with the operation is to be stored and/or should be stored, depending on whether the received operation is put key or get key, respectively. Media manager 308 is configured to use the physical address to complete the operation. In some embodiments, media manager 308 is implemented using a processor, firmware, and/or controller. In some embodiments, media manager 308 is configured to perform error correction on values retrieved from persistent memory media 310.

As will be described in further detail below, media manager 308 of KVPM 304 handles the keys and values received from application 302 directly. In various embodiments, handling the keys and values received from application 302 "directly" refers to writing to and reading (accessing) from persistent memory media 310 without performing a logical-to-physical address mapping. Instead, KVPM 304 uses the given key of an operation to determine a page in persistent memory media 310 at/from which to complete the operation. In addition, accesses in KVPM 304 exhibit much shorter I/O paths and lower overhead than they would in a conventional key-value store that is implemented by a NAND flash storage. No compaction among memory table and multiple levels of SST files is needed because persistent memory media 310 is non-volatile. There is no complex FTL or garbage collection either because no logical-to-physical mapping is used and also, in-place updates are permitted by persistent memory media 310.

While not shown in system 300, application 302 may optionally apply a cache in volatile memory (DRAM) to hold frequently accessed data (e.g., frequently accessed key-value pairs). Application 302 may also keep indexing data and Bloom Filters in DRAM to further accelerate accesses.

Figure 4A:
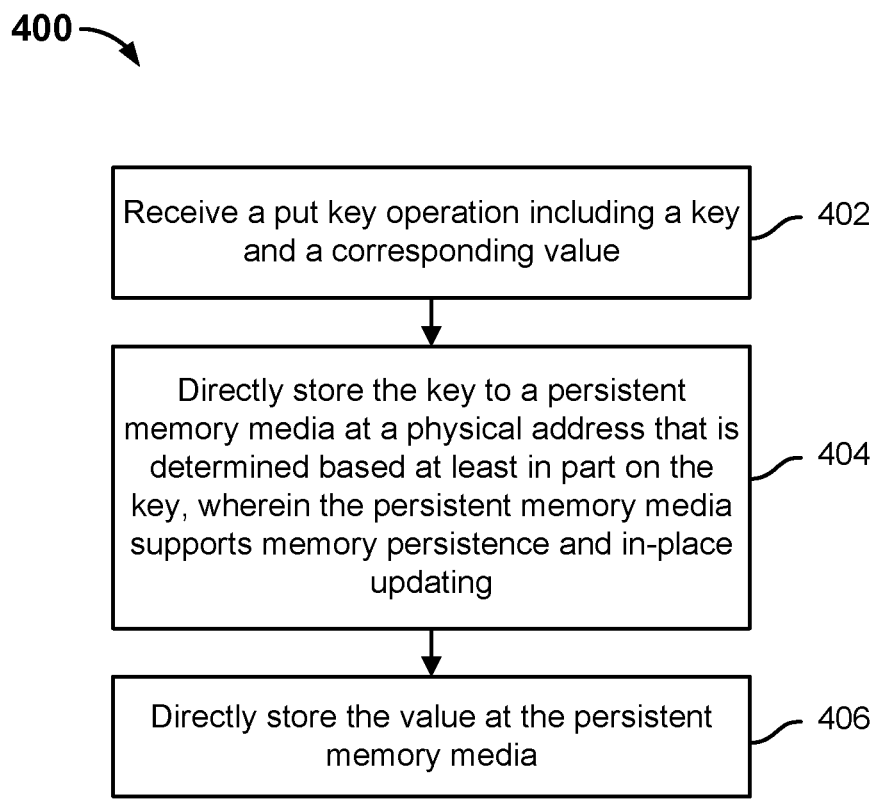
FIG. 4A is a flow diagram showing an embodiment of a process for storing a received key-value pair at a persistent memory for key-value storage.

FIG. 4A is a flow diagram showing an embodiment of a process for storing a key-value pair at a persistent memory for key-value storage. In some embodiments, process 400 is implemented at a KVPM such as KVPM 304 of FIG. 3.

At 402, a put key operation including a key and a corresponding value is received. In various embodiments, a put key operation comprises a request to store a key-value pair that is included in the put key operation. For example, the put key operation is received from an application.

For example, the put key is provided by a database application for managing key-value pairs that include a book ISBN (key) and a book title (value). For instance, the key-value pair provided by the application in a put key operation is "0743273567—The Great Gatsby."

At 404, the key is directly stored at a persistent memory media using a physical address that is determined based at least in part on the key, wherein the persistent memory media supports memory persistence and in-place updating. In various embodiments, a key from an operation such as a put key operation is directly mapped to a page of the persistent memory media of the KVPM using a hash function. For example, the hash function maps at least a portion of the key to a physical address at the persistent memory media at which to potentially store the key of the put key operation.

The following is an example formula for mapping a key to a physical address in the persistent memory media:

$$\text{Key}_{address} = (\text{Hash}(\text{Key}) \% \text{ NumOfPages}) * \text{PageSize} \quad (1)$$

where $\text{Key}_{address}$ is the physical address of a memory page at the persistent memory media at which to potentially store the key included in the operation, Hash( ) is a hash function that maps the key to a fixed-length value, NumOfPages is the total number of pages in usable capacity of the persistent memory media, and PageSize is the size of each memory page in bytes. $\text{Key}_{address}$ is aligned to a page boundary in the KVPM. An example of Hash( ) is the Jenkins hash function.

Formula (1) is only one example equation associated with a hashing technique that can be used to map a key of an operation to a physical address of a page in the persistent memory media and other mapping techniques may be used in practice.

The key of the put key operation is stored in the page in the persistent memory media associated with the $\text{Key}_{address}$ unless it is determined that the page is already storing another, different key. In this event, a hash collision has occurred, in which two or more keys have been mapped to the same address in the persistent memory media. In some embodiments, when a hash collision occurs, an "open addressing" strategy is used. When the hashed-to page of a key is not available (because it already stores another key, for example), in some embodiments, a probe sequence is used to look for an available page in the persistent memory media. In various embodiments, a "probe sequence" refers to a selection technique of a next page in the persistent memory media to check for availability to store a key. For example, a probe sequence may indicate to check the page in the persistent memory media that is a certain number of pages (e.g., five pages) away from the current page in question. To reduce repeated collisions and clustering, in some embodiments, double hashing is used to derive the probe sequence—the interval that the probe sequence steps forward each time is calculated from another independent hash function. The probe sequence is followed to identify an available page in the persistent memory media until such a page is found or the maximum number of attempts to find such a page is reached.

Returning to the previous example, once an available page in the KVPM is determined to store the key of the put key operation, the ISBN (key) of "0743273567" will be stored in that page.

Where it is determined that a page in the persistent memory media already stores the given key of the put key operation, it is determined that the put key operation is associated with updating a previously stored key-value pair with a new value. In various embodiments, either in-place (e.g., overwriting of the previous value) updating may be performed or out-of-place (e.g., not overwriting of the previous value) updating may be performed at the persistent memory media, as will be described in further detail below.

At 406, the value is directly stored at the persistent memory media. After the key is stored in a page in the persistent memory media, the value corresponding to the key is stored in one or more other pages in the persistent memory media. If the value is too large to be stored in one page in the persistent memory media, the value is stored across multiple pages (not necessarily contiguous pages) in the persistent memory media. In some embodiments, the pages in which to store the value may be selected using any appropriate technique so long as they are free/unused for storing other data. For example, pages nearby the key page may be linearly searched through until a free page is found for storing the value. In another example, a random page in the KVPM is selected until a free page is found for storing the value.

In various embodiments, the page at which the key is stored (which is sometimes referred to as the "key page") is linked to the first page that stores the value (which is sometimes referred to as a first "value page") corresponding to the key. In some embodiments, the key page is linked to the first value page by storing a pointer to the first value page in the metadata portion of the key page in the persistent memory media. In some embodiments, a pointer to a page comprises a physical address of the page. In various embodiments, the metadata portion of a page in the persistent memory media is the out-of-band (OOB) space of the page. In various embodiments, the OOB space of a page in the persistent memory media is the portion of the page that is in addition to the portion used to store user data and is only visible to the KVPM internally. The page(s) that store the value are also linked together through storing pointers from one value page to another in the metadata portion (e.g., the OOB space) of the value pages in the persistent memory media. The series of linked value pages associated with storing a value is sometimes referred to as a "value page chain."

Returning to the previous example, title (value) of "The Great Gatsby" corresponding to the ISBN (key) "0743273567" will be stored across one or more allocated value pages. The key page that stores "0743273567" will include a pointer to at least the first value page of the value page chain that stores "The Great Gatsby." Each value page that stores a portion of "The Great Gatsby" will also include a pointer that points to the next value page of the chain, if any.

Figure 4B:
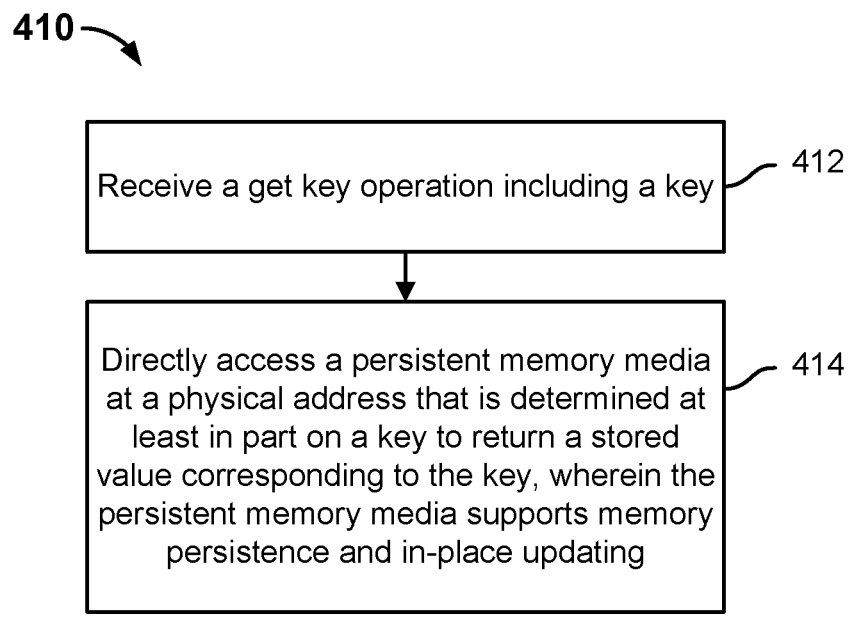
FIG. 4B is a flow diagram showing an embodiment of a process for retrieving a stored value corresponding to a received key at a persistent memory for key-value storage.

FIG. 4B is a flow diagram showing an embodiment of a process for retrieving a stored value corresponding to a received key at a persistent memory for key-value storage. In some embodiments, process 410 is implemented at a KVPM such as KVPM 304 of FIG. 3.

At 412, a get key operation including a key is received. Sometime after the key-value pair of the put key operation is stored at the persistent memory media (e.g., using a process such as process 400 of FIG. 4A), a get key operation associated with retrieving a stored value corresponding to a stored key-value pair is received. The get key operation includes the key for which the corresponding value is requested.

For example, the get key operation is received from the application for managing key-value pairs that include a book ISBN (key) and a book title (value). For instance, to retrieve the book title (value) corresponding to the ISBN (key) of "0743273567," that key is provided by the application in a get key operation.

At 414, a persistent memory media is directly accessed using a physical address that is determined based at least in part on the key to return a stored value corresponding to the key, wherein the persistent memory media supports memory persistence and in-place updating. In various embodiments, the given key of the get key operation is mapped to the same physical address in the persistent memory media at which the key is expected to be stored. In various embodiments, the same hash function that was used to store (e.g., complete the put key operation) the operation for a key is used to perform the get key operation.

For example, if formula (1) above was used to store the key in the persistent memory media in a put key operation, then formula (1) above is also used to read the stored value corresponding to the given key of the get key operation. Similar to the description above, in the event that the page at the physical address to which the given key was hashed does not store the given key, then the same probe sequence that was used to resolve the hash collision for the put key operation is used to search for the correct page at which the given key was stored for the get key operation. Once the key page is identified, the pointer to the first value page that is stored in the key page is used to locate the first value page in the persistent memory media. The first value page also includes a pointer to the next value page, if one exists, and so forth. As such, the value corresponding to the given key of the get key operation may be retrieved from the chain of one or more value pages for the application.

Returning to the previous example, once the key page in the KVPM that is used to store ISBN (key) of "0743273567" is determined, the pointer stored in the key page to the first value page that stores the corresponding value is used to locate the first value page. The portion of the value ("The Great Gatsby") is read from the first value page and the pointer stored in each value page that points to the next value page in the chain is used to locate each subsequent value page, if one exists, until the complete value of "The Great Gatsby" is retrieved.

Figure 4C:
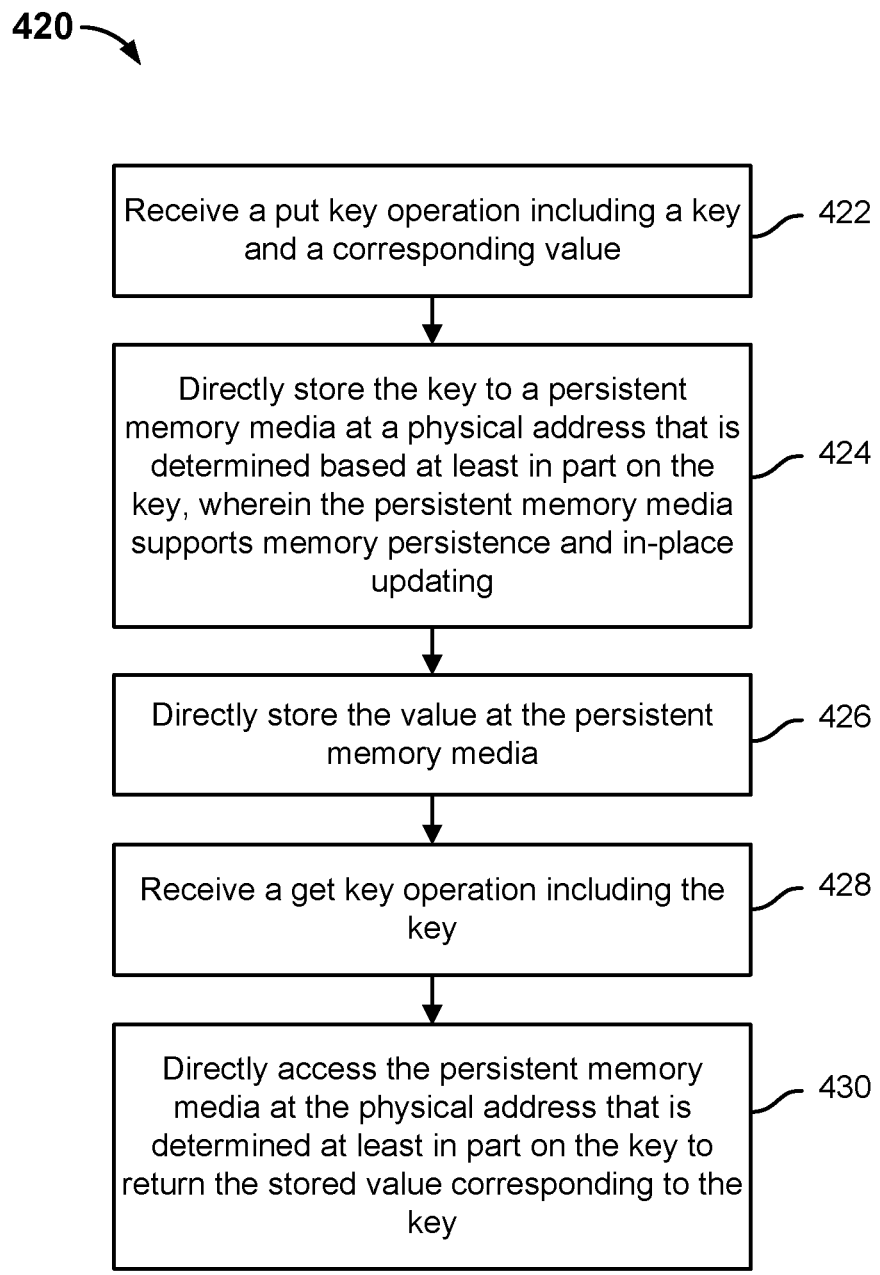
FIG. 4C is a flow diagram showing an embodiment of a process for using persistent memory for key-value storage.

FIG. 4C is a flow diagram showing an embodiment of a process for using persistent memory for key-value storage. In some embodiments, process 420 is implemented at a KVPM such as KVPM 304 of FIG. 3.

At 422, a put key operation including a key and a corresponding value is received.

At 424, the key is directly stored at a persistent memory media using a physical address that is determined based at least in part on the key, wherein the persistent memory media supports memory persistence and in-place updating.

At 426, the value is directly stored at the persistent memory media.

At 428, a get key operation including the key is received.

At 430, the persistent memory media is directly accessed using the physical address that is determined based at least in part on the key to return the stored value corresponding to the key.

Figure 5:
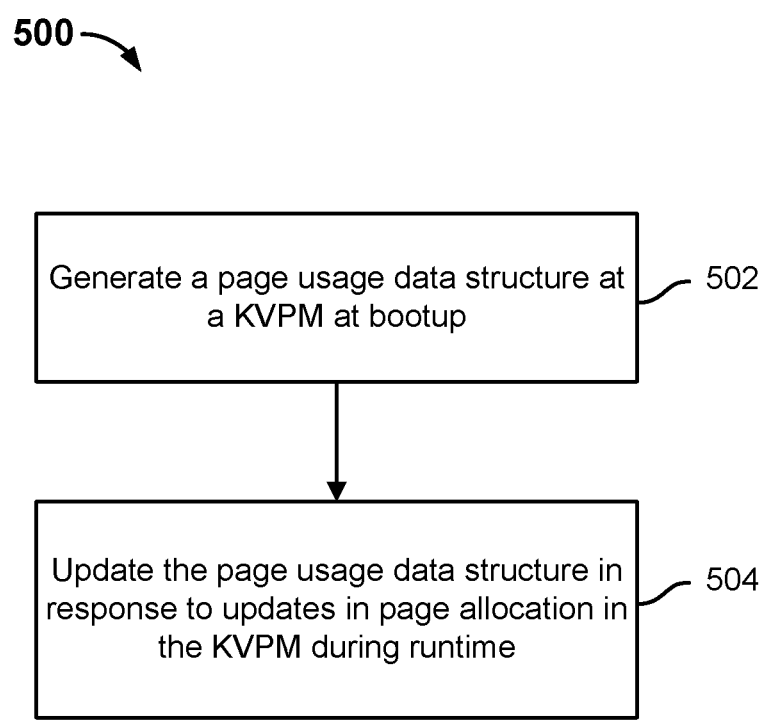
FIG. 5 is a flow diagram showing an embodiment of a process for maintaining a page usage data structure.

FIG. 5 is a flow diagram showing an embodiment of a process for maintaining a page usage data structure. In some embodiments, process 500 is implemented at KVPM 304 of FIG. 3.

Process 500 describes an example process of maintaining a data structure that tracks which memory pages of the KVPM are used or unused/free during runtime.

At 502, a page usage data structure is generated at a KVPM at boot time. At the boot time of the KVPM, the memory pages of the KVPM are scanned to determine which pages are used/cannot be allocated (e.g., have been written to with data that is to be retained) and which pages are free/unused/can be allocated (e.g., have not been written to and/or have been written to but with data that is not to be retained). For example, data that is to be retained in a page is data that is not requested by the application to be deleted/released while data that is not to be retained is data that is requested by the application to be deleted/released. In some embodiments, a page's used or unused status is determined based at least in part on scanning a metadata field (e.g., the page type field in the OOB space) of that page. In some embodiments, the page usage data structure comprises a bitmap that is stored in a DRAM, where each memory page has a corresponding bit in the bitmap that indicates whether the page is free and therefore available to be allocated for a new write (e.g., a new key or a new value), or not.

At 504, the page usage data structure is updated in response to updates in page allocation in the KVPM during runtime. During runtime, as new key-value pairs are written to and released from the pages of the KVPM, the page usage data structure is continuously/dynamically updated to track which pages are currently unused or used, as will be described in further detail below.

FIG. 6A shows example metadata that is stored for a key page and FIG. 6B shows example metadata that is stored for a value page. In various embodiments, the metadata that is stored for each key page (as mentioned above, a key page is a page in the KVPM that stores a key) and the metadata that is stored for each value page (as mentioned above, a value page is a page in the KVPM that stores at least a portion of a value corresponding to a key) are stored in the page's respective OOB space.

As shown in FIG. 6A, the example metadata that is stored in the key page includes the following:

Page type field: this field is set to "key page" to indicate that this is a key page.

Pointer to current value page chain: this field includes a pointer to a (e.g., physical address of) (e.g., first) value page in the KVPM that stores a value corresponding to the key.

Snapshot count: this field includes a value associated with how many snapshot versions of values exist for this key-value record. This counter increments every time a snapshot version is created (i.e., an update with out-of-place mode is performed), and decrements when a snapshot version is released (e.g., a snapshot version is marked for deletion). Details of snapshot versions are described in greater detail below.

Delete flag: this field indicates whether a key-value record is marked for deletion from the KVPM. In some embodiments, deletion is deferred if there are still unreleased snapshot versions (i.e., the snapshot count is non-zero). Once all snapshot versions of values for a key are released, the key-value record is deleted with all pages freed/released.

Statistical information: this field stores statistical information to track usage of the key-value record. For example, this field may store the read/write count of the key-value record.

As shown in FIG. 6B, the example metadata that is stored in the value page includes the following:

Page type field: this field is set to "value page" to indicate that this is a value page.

Version number of the value page chain: this field includes a version number of the value that is stored in the current value page. The value in this field is assigned by a host. For example, the version number may indicate "current" for the current version of the value or a numeric value associated with the snapshot version with which the value is associated.

Pointer to next value page in chain: If the current value page is the last page of a value page chain, then this field stores a pointer that is set to an invalid address.

Pointer to previous version of value page chain: If no previous version of a value exists, then this field stores a null pointer. This field only stores data for a value page that is the first page of a value page chain.

Back pointer: For the first page in a value page chain, this field includes a pointer that points back to the key page. For pages other than the first page in a value page chain, this field includes a pointer that points back to the previous page in the chain.

For unused (free) pages, their "page type" fields are set to "unused" with all other metadata fields reset to a pre-defined "reset" state.

Figure 7:
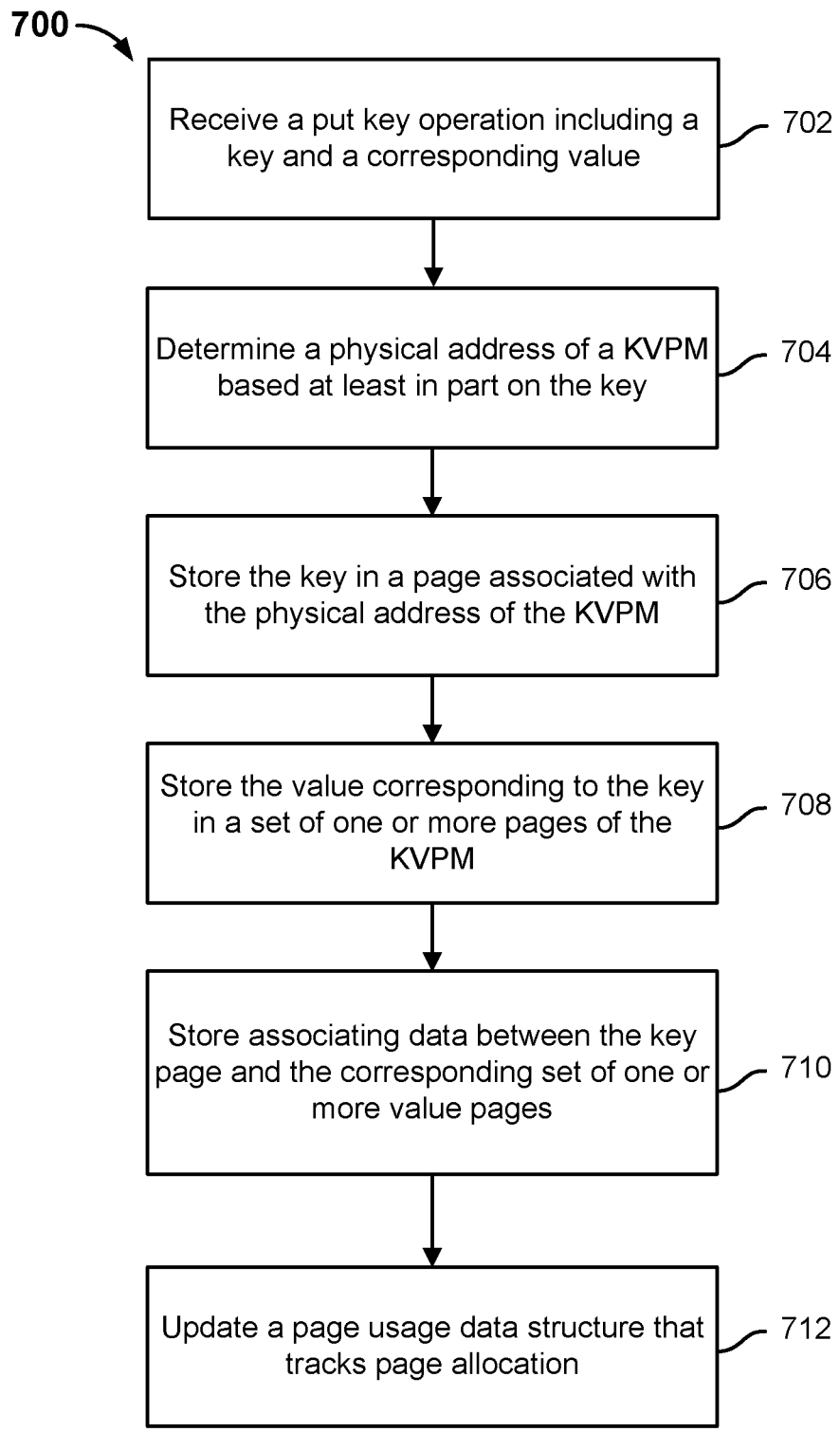
FIG. 7 is a flow diagram showing an embodiment of a process for storing a new key-value pair in a KVPM.

FIG. 7 is a flow diagram showing an embodiment of a process for storing a new key-value pair in a KVPM. In some embodiments, process 700 is implemented at KVPM 304 of FIG. 3. In some embodiments, process 400 of FIG. 4A or steps 422-426 of process 420 of FIG. 4C are implemented at least in part using process 700.

At 702, a put key operation including a key and a corresponding value is received. For example, the put key operation is received from an application. In process 700, the received put key operation is configured to store a new given key-value pair at the KVPM.

At 704, a physical address of a KVPM is determined based at least in part on the key. In various embodiments, a formula including a hash function (e.g., formula (1) above) is used to compute a physical address of the KVPM based on at least a portion of the key.

At 706, the key is stored in a page associated with the physical address of the KVPM. The page in the KVPM that is associated with the physical address that is determined by the hash function is first checked for whether it is unused/free. For example, whether a page is unused or used may be determined by checking its "page type" field, as described above with FIGS. 6A and 6B. For example, if the page type field indicates "unused," then the page is free; but if the page type field indicates a value other than "unused" (e.g., "value page," "key page"), then the page is used. If the page is used, then a hash collision may have occurred and another unused page may be determined using a predetermined probe sequence, in some embodiments. In various embodiments, the predetermined probe sequence may comprise any technique for selecting a next page (e.g., relative to the current page that is determined) for which the page type (e.g., used or unused) is to be checked. Once an unused page is determined relative to the physical address that is determined by the hash function, the key is stored in that page. In various embodiments, the metadata stored in the OOB space of the key page is updated such that the page field type is "key page."

In some embodiments, more than one key may be stored at a single page of the KVPM (e.g., based on a user configuration of the KVPM). Therefore, in some embodiments, in the event where the page of the KVPM associated with the physical address determined by the hash function already includes one or more existing keys, the new key will still be stored at that page. Metadata corresponding to each key of the page will be stored in the OOB space of that page. However, for purposes of illustration, a page is configured to store one key in embodiments described herein, unless noted otherwise.

At 708, the value corresponding to the key is stored in a set of one or more pages of the KVPM. It is determined whether the value needs to be stored in a single page of the KVPM or more than one page. For example, a page in the KVPM may store up to 4 KB of user data so the total number of pages that will be needed to store the value will be the size of the value divided by 4 KB. In some embodiments, a user may configure a restriction on which set of unused pages of the KVPM (e.g., pages associated with a certain range of addresses) may be allocated for storing the key. The number of unused pages that are needed to store the value are allocated according to any restrictions on such value pages and then used to store the value corresponding to the key. In various embodiments, the pages that are used to store the value corresponding to the key are not required to be contiguous. In various embodiments, allocating a value page includes determining unused pages using the page usage data structure and setting the page type field of a determined unused page to "value page."

At 710, associating data between the key page and the corresponding set of one or more value pages is stored. In various embodiments, pointers between the key page and the value pages are stored in the metadata stored in the pages' OOB space. Specifically, in some embodiments, the physical address of the page in the KVPM that is the (first) page of the value page chain is stored in the OOB space (e.g., in the "pointer to current value page chain" field of the key page in FIG. 6A) of the key page. In some embodiments, the physical address of the page in the KVPM that is the next page, if any, of the value page chain is stored in the OOB space (e.g., in the "pointer to next value page in chain" field of the value page in FIG. 6B) of a value page. In some embodiments, the physical address of the page in the KVPM that is a previous page, if any, of the value page chain is stored in the OOB space (e.g., in the "back pointer" field of the value page in FIG. 6B) of a value page that is other than the first page of the value page chain. In some embodiments, the physical address of the page in the KVPM that is the key page is stored in the OOB space (e.g., in the "back pointer" field of the value page in FIG. 6B) of the first value page of the value page chain. In some embodiments, a version number of the value page chain that indicates that the value page chain is the current version of the value corresponding to the key is stored in the OOB space (e.g., in the "version number of the value page chain" field of the value page in FIG. 6B) of each value page of the value page chain.

At 712, a page usage data structure that tracks page allocation is updated. The page usage data structure is updated to indicate that the pages associated with storing the key and value of the key-value pair are now used.

In various embodiments, when a previous value of a stored key is updated to a new value, the KVPM supports both in-place and out-of-place update modes.

Figure 8:
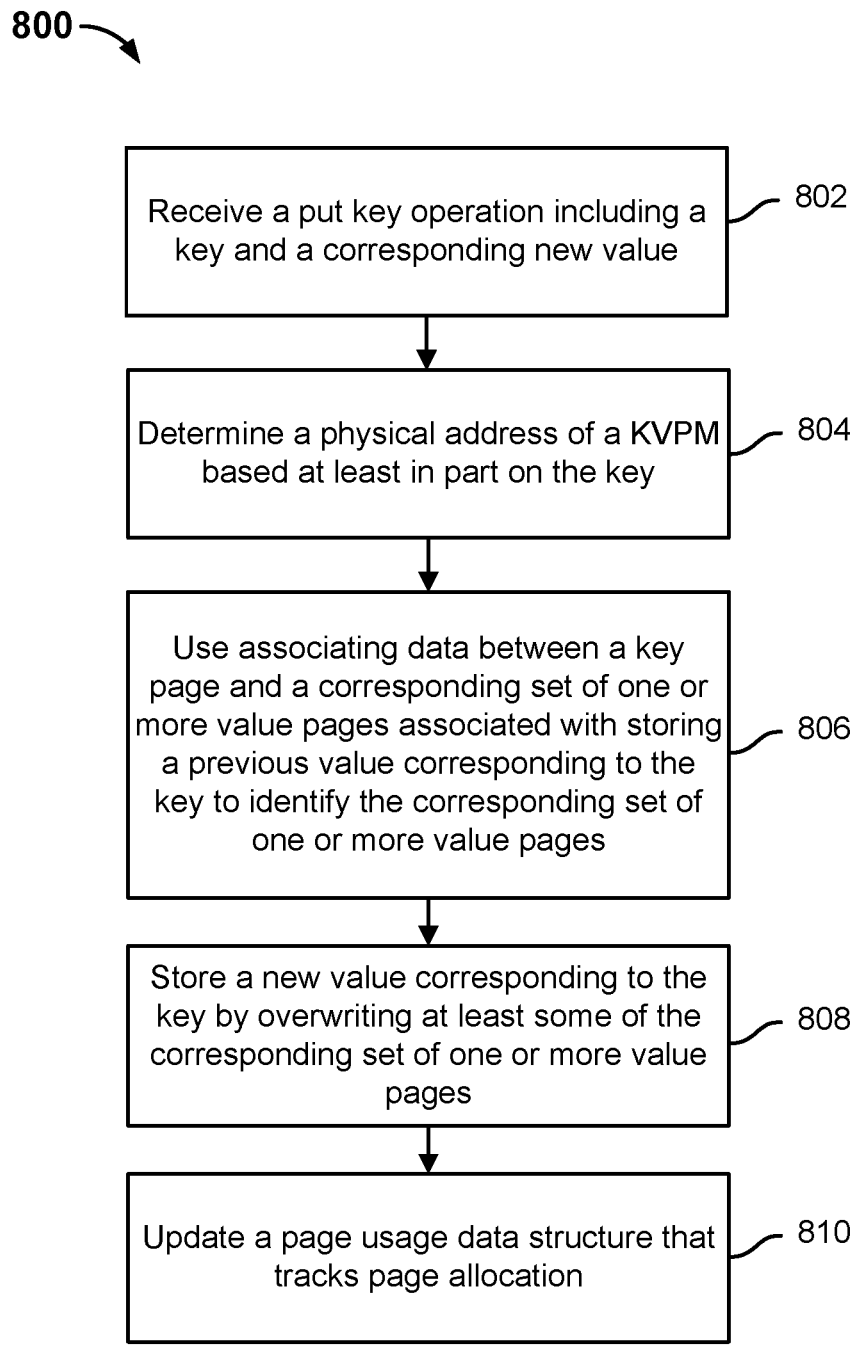
FIG. 8 is a flow diagram showing an embodiment of a process for performing an in-place update for a stored key.

When an in-place update is used, at least a portion of the page(s) that were used to store a previous value corresponding to a stored key is overwritten with the new/updated value of the stored key. In the event that fewer pages are needed to store the new/updated value of the stored key, the additional value page(s) are released (e.g., set to be unused so that they can be allocated for new writes). For example, an in-place update may be desirable when it is not needed or desired to preserve a previous version of a value corresponding to a key. FIG. 8 is an example flow of an in-place update.

Figure 9:
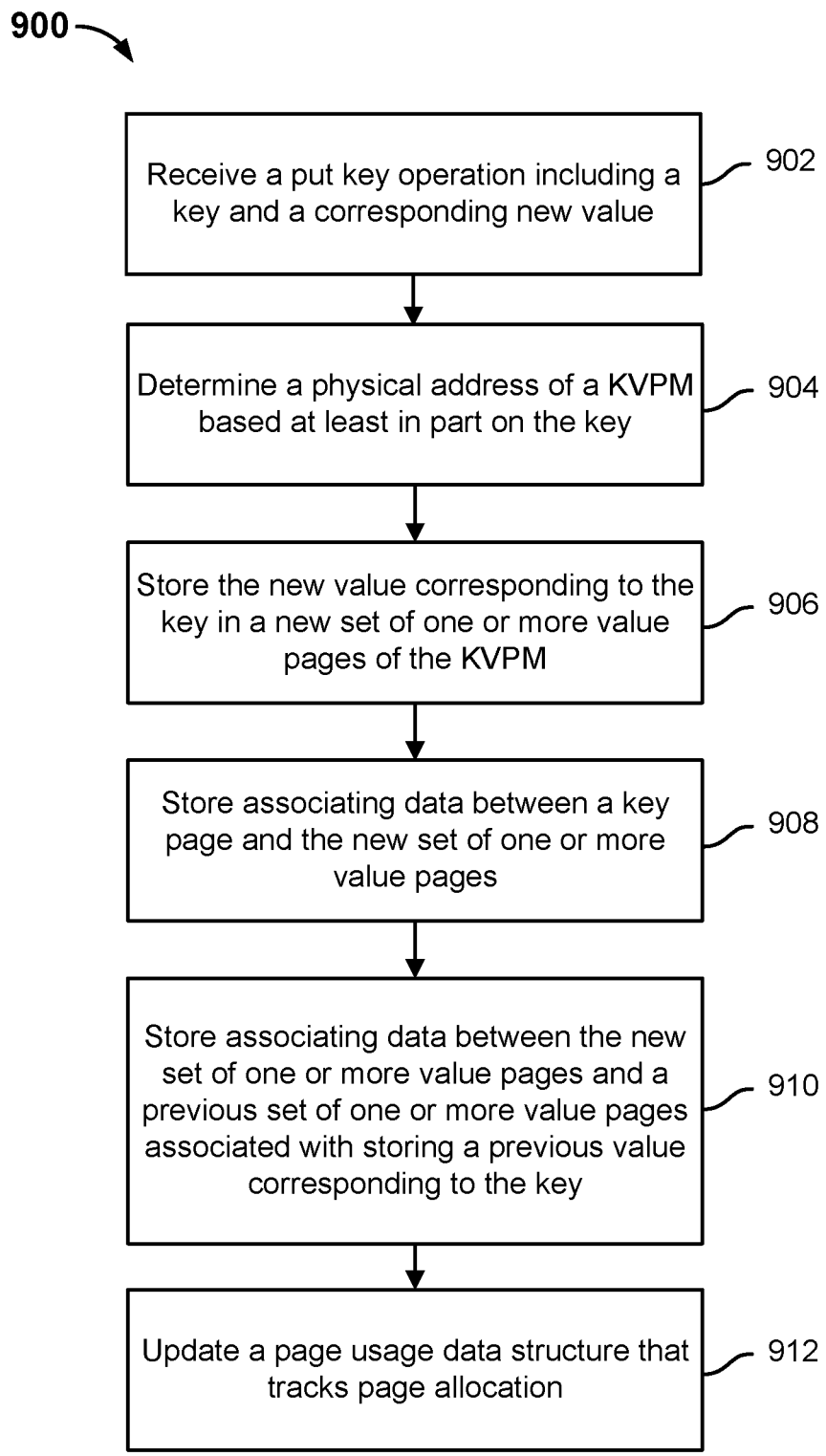
FIG. 9 is a flow diagram showing an embodiment of a process for performing an out-of-place update for a stored key.

When an out-of-place update is used, new value pages are allocated to store the current version of the value of a stored key and the value pages that store a previous value corresponding to the key become a previous version. The previous value is sometimes referred to as a "snapshot version." For example, a snapshot of a previous value may be retained in the event that the host requests to restore that previous version of the value for whatever reason. In a specific example, a host may wish to create a snapshot version of a value corresponding to a stored key prior to a system update. In the event that the system update does not succeed, the snapshot version of the value may be recovered to help restore the system to a stable state prior to the updating. After a snapshot version of a value is generated, the key page is updated to point to the new value pages that store the current version of the value. A pointer back to the value pages storing the older, snapshot version of the value is stored in the new value page chain storing the current version of the value, so that the host can access previous snapshots easily. FIG. 9 is an example flow of an out-of-place update.

A host can dynamically select the update mode (e.g., the in-place mode to avoid creating snapshots and the out-of-place mode to intentionally create snapshots) at runtime, and at a per-key granularity, for example. While the in-place mode is more space efficient because it reuses previous value pages and avoids the creation of snapshot versions, past value states are lost when new values are written to the KVPM for a key. While the out-of-place mode is less space efficient because it creates a snapshot of a past value each time a new value is to be written to the KVPM for a key, past value states are retained and available to be restored, should the need arise. In some embodiments, the update mode may be set by setting the value of a global variable associated with the update mode. This allows the host to create fine-grained snapshots on-demand. For example, the host can enable out-of-place updates on relevant key/value records before performing a critical update, and switch to the in-place update mode when snapshotting is not needed. This not only provides much more flexibility, but also reduces space waste caused by unused/unnecessary snapshot copies.

FIG. 8 is a flow diagram showing an embodiment of a process for performing an in-place update for a stored key. In some embodiments, process 800 is implemented at KVPM 304 of FIG. 3. In some embodiments, at least part of process 400 of FIG. 4A or steps 422-426 of process 420 of FIG. 4C are implemented using process 800.

At 802, a put key operation including a key and a corresponding new value is received. For example, the put key operation is received from an application. In process 800, the received put key operation is configured to store a new value, in-place, corresponding to a previously stored key at the KVPM.

At 804, a physical address of a KVPM is determined based at least in part on the key. In various embodiments, a formula including a hash function (e.g., formula (1) above) is used to compute a physical address of the KVPM based on at least a portion of the key. The page in the KVPM that is associated with the physical address that is determined by the hash function is first checked for whether it contains the key included in the put key operation. In some embodiments, the predetermined probe sequence is used to select the next page to check for the key included in the put key operation, until the appropriate key page is located.

At 806, associating data between a key page and a corresponding set of one or more value pages associated with storing a previous value corresponding to the key is used to identify the corresponding set of one or more value pages. The metadata (e.g., pointers) stored in the OOB space of the located key page is used to locate the value pages that store the previous version of the value corresponding to the key.

At 808, a new value corresponding to the key is stored by overwriting at least some of the corresponding set of one or more value pages. As many of the identified value pages that are needed to store the new value of the key are overwritten by new value. In the event that more value pages are needed to store the new value corresponding to the key, additional pages are allocated for doing so. In the event that fewer value pages are needed to store the new value corresponding to the key, the remaining value pages are released.

At 810, a page usage data structure is updated. The page usage data structure is updated to indicate that the additional page(s) associated with updated values are now used or that the released value pages are now unused.

FIG. 9 is a flow diagram showing an embodiment of a process for performing an out-of-place update for a stored key. In some embodiments, process 900 is implemented at KVPM 304 of FIG. 3. In some embodiments, at least part of process 400 of FIG. 4A or steps 422-426 of process 420 of FIG. 4C are implemented using process 900.

At 902, a put key operation including a key and a corresponding new value is received. For example, the put key operation is received from an application. In process 900, the received put key operation is configured to store a new value, out-of-place, corresponding to a previously stored key at the KVPM.

At 904, a physical address of a KVPM is determined based at least in part on the key. In various embodiments, a formula including a hash function (e.g., formula (1) above) is used to compute a physical address of the KVPM based on at least a portion of the key. The page in the KVPM that is associated with the physical address that is determined by the hash function is first checked for whether it contains the key included in the put key operation. In some embodiments, the predetermined probe sequence is used to select the next page to check for the key included in the put key operation, until the appropriate key page is located.

At 906, the new value corresponding to the key is stored in a new set of one or more value pages of the KVPM. It is determined whether the new value needs to be stored in a single page of the KVPM or more than one page. In some embodiments, a user may configure a restriction on which set of unused pages of the KVPM (e.g., pages associated with a certain range of addresses) may be allocated for storing the key. The number of unused pages that are needed to store the new value are allocated according to any restrictions on such value pages and then used to store the new value corresponding to the key. The value pages used to store the new value are referred to as the new value page chain.

At 908, associating data between a key page and the new set of one or more value pages is stored. In some embodiments, the physical address of the page in the KVPM that is the (first) page of the new value page chain is stored in the OOB space (e.g., in the "pointer to current value page chain" field of the key page in FIG. 6A) of the key page. In some embodiments, the physical address of the page in the KVPM that is the next page, if any, of the new value page chain is stored in the OOB space (e.g., in the "pointer to next value page in chain" field of the value page in FIG. 6B) of a value page of the new value page chain. In some embodiments, the physical address of the page in the KVPM that is a previous page, if any, of the new value page chain is stored in the OOB space (e.g., in the "back pointer" field of the value page in FIG. 6B) of a value page that is other than the first page of the new value page chain. In some embodiments, the physical address of the page in the KVPM that is the key page is stored in the OOB space (e.g., in the "back pointer" field of the value page in FIG. 6B) of the first value page of the new value page chain. In some embodiments, a version number of the new value page chain that indicates that the value page chain is the current version of the value corresponding to the key is stored in the OOB space (e.g., in the "version number of the value page chain" field of the value page in FIG. 6B) of each value page of the new value page chain.

As will be described in further detail below, multiple out-of-place updates of values corresponding to a key will result in a linked list of value page chains associated with different snapshot versions of values corresponding to the key.

At 910, associating data between the new set of one or more value pages and a previous set of one or more value pages associated with storing a previous value corresponding to the key is stored. In some embodiments, the physical address of the page in the KVPM that is the (first) value page of the previous value page chain that stores the immediately previous version of the value corresponding to the key is stored in the OOB space (e.g., in the "pointer to previous version of value page chain" field of the value page in FIG. 6B) of the first page of the new value page chain.

At 912, a page usage data structure that tracks page allocation is updated. The page usage data structure is updated to indicate that the pages associated with storing the new value are now used.

Figure 10:
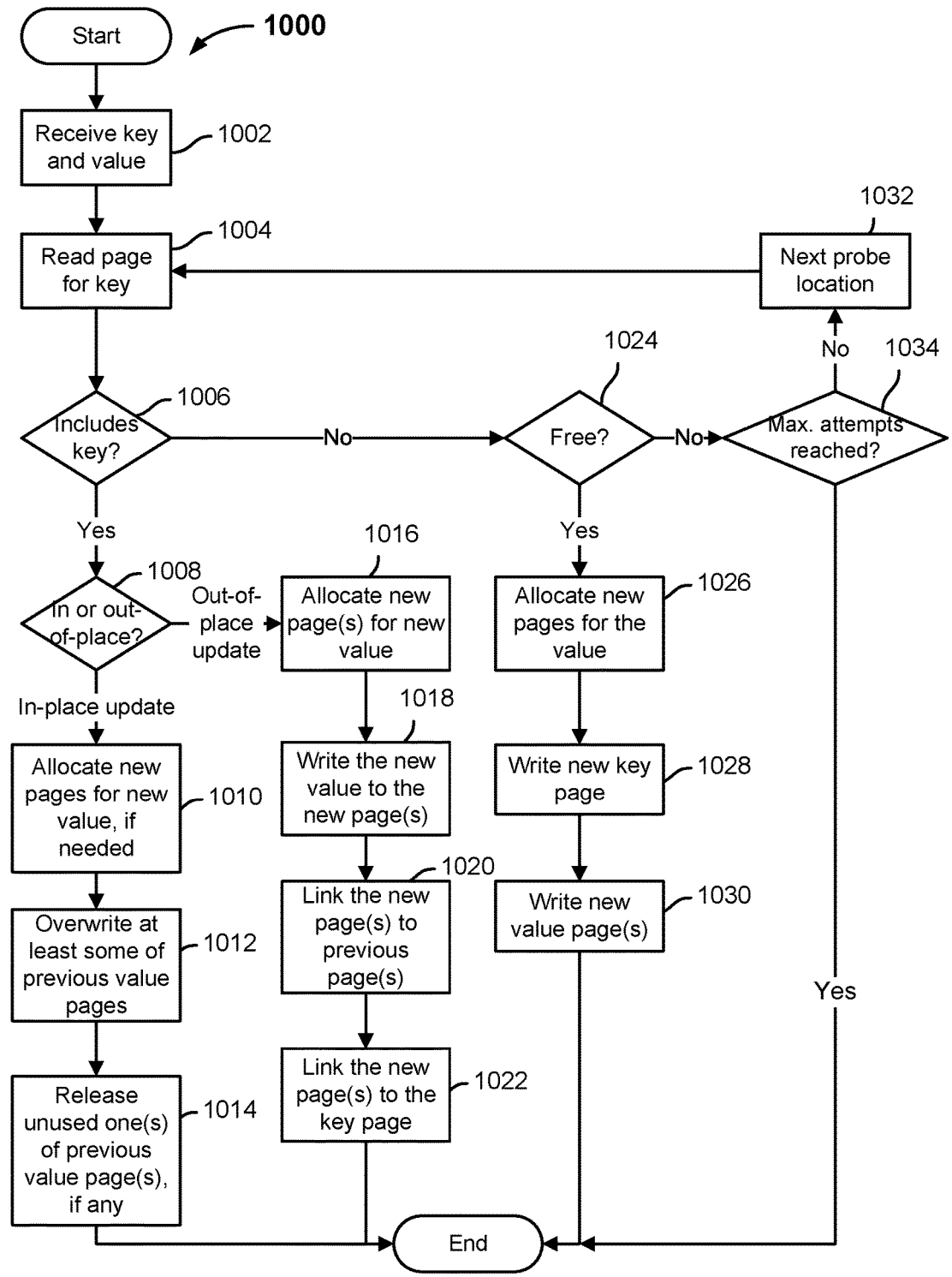
FIG. 10 is a flow diagram showing an example of a process for performing a put key operation.

FIG. 10 is a flow diagram showing an example of a process for performing a put key operation. In some embodiments, process 1000 is implemented at KVPM 304 of FIG. 3. In some embodiments, at least part of process 400 of FIG. 4A or steps 422-426 of process 420 of FIG. 4C are implemented using process 1000. In some embodiments, process 700 of FIG. 7, process 800 of FIG. 8, and process 900 of FIG. 9 may be implemented at least in part using process 1000.

At 1002, a key and a corresponding value are received. A key and a corresponding value are received in a put key operation (e.g., from an application).

At 1004, a page is read for the key. For example, at least a portion of the key may be hashed to a physical address of the KVPM. That page is read to determine whether the key is stored in that page.

At 1006, it is determined whether the page includes the key. The determined physical address of the KVPM is read to determine whether the key is stored in that page. In the event that the key is not stored in that page, control is transferred to 1024. Otherwise, in the event that the key is stored in that page, it is determined that an update to a value of the previously stored key is to occur and the control is transferred to 1008.

At 1024, it is determined whether the page is free. In the event that the page that is checked for the key does not include the key and is also not free (e.g., the page stores another key), then a hash collision may have occurred and a predetermined probe sequence is used to determine the next page in the KVPM to check. At 1034, it is determined whether a maximum number of attempts of the probe sequence has been reached. In some embodiments, a maximum on the number of attempts of the probe sequence (e.g., five attempts) may be established to determine when to return a failure message in response to the put key operation. In the event that it is determined that the maximum number of attempts of the probe sequence has not been reached, then a next probe location (e.g., a next page of the KVPM) is checked for the key at 1032 and control is then returned to 1004. In the event that it is determined that the maximum number of attempts of the probe sequence has been reached, process 1000 ends and a failure message is optionally returned to the entity (e.g., application) from which the put key operation was received.

In the event that the page that is checked for the key does not include the key but is free, then control is transferred to 1026

At 1026, new page(s) are allocated for the value. As many pages of the KVPM that are needed to store the value are allocated.

At 1028, a new key page is written. The free page determined at 1024 is written with the key of the put key operation and becomes the new key page.

At 1030, new value page(s) are written. The newly allocated page(s) of 1026 are written with the value of the put key operation and become a new value page chain.

At 1008, it is determined whether an in-place update or an out-of-place update is to be performed. Various mechanisms can be used to determine the mode of update. For example, the mode of update may be determined based on the value set of a global variable. In various embodiments, the mode of update may be set at various granularities (e.g., at the operation level or at the application level). In the event that an in-place update is to be performed, control is transferred to 1010. Otherwise, in the event that an out-of-place update is to be performed, control is transferred to 1016.

At 1010, additional pages are allocated for a new value, if needed. If the new value corresponding to the key will require mores pages to store than the previous value, then one or more additional pages of the KVPM are to be allocated.

At 1012, at least some of previous value pages are overwritten. At least some of value pages that were used to store the previous version of the value corresponding to the key are overwritten with the new value.

At 1014, unused one(s) of the previous value pages are released. If fewer than all of the value pages that were used to store the previous version of the value corresponding to the key are not overwritten, they are released (e.g., marked as unused so that they may be allocated again).

At 1016, new page(s) for storing the new value are allocated. As many new pages that are needed to store the new value corresponding to the key are allocated.

At 1018, the new value is written to the new page(s).

At 1020, the new page(s) are linked to previous page(s) associated with storing a previous value corresponding to the key. A pointer pointing to the (first page of) the new page(s) storing the new value is stored in at least one page of the previous page(s) storing the previous value.

At 1022, the new page(s) are linked to the key page. A pointer pointing to the (first page of) the new page(s) storing the new value is stored in the key page. A pointer pointing to the key page is stored in at least one of the new page(s) storing the new value.

Figure 11:
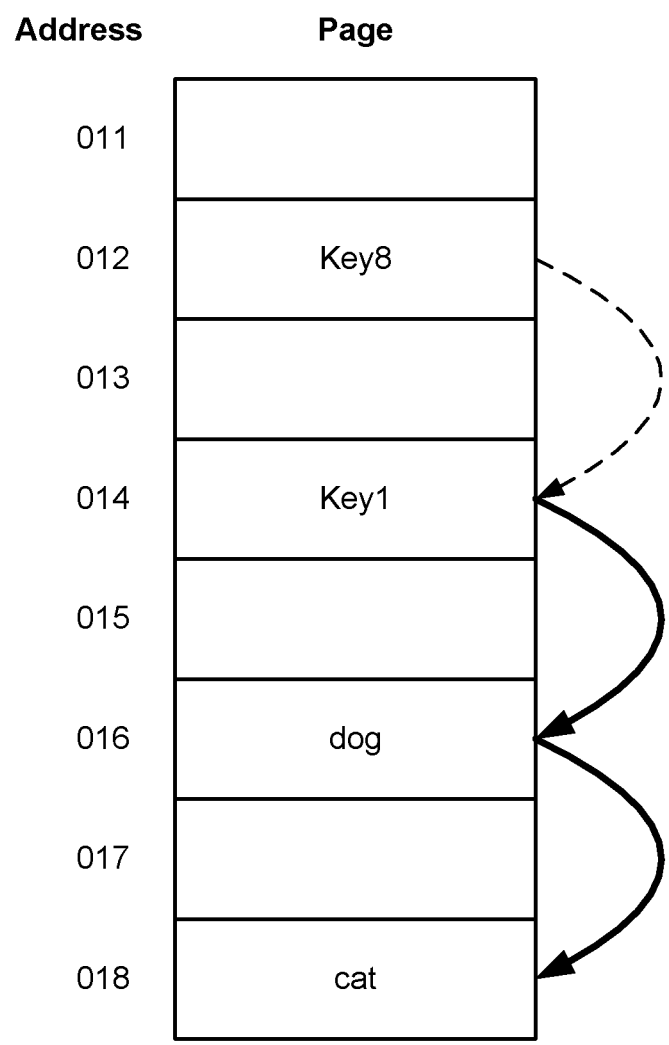
FIG. 11 shows an example of the result of using the put key operation to store a new key-value pair in pages of the KVPM.
Figure 12:
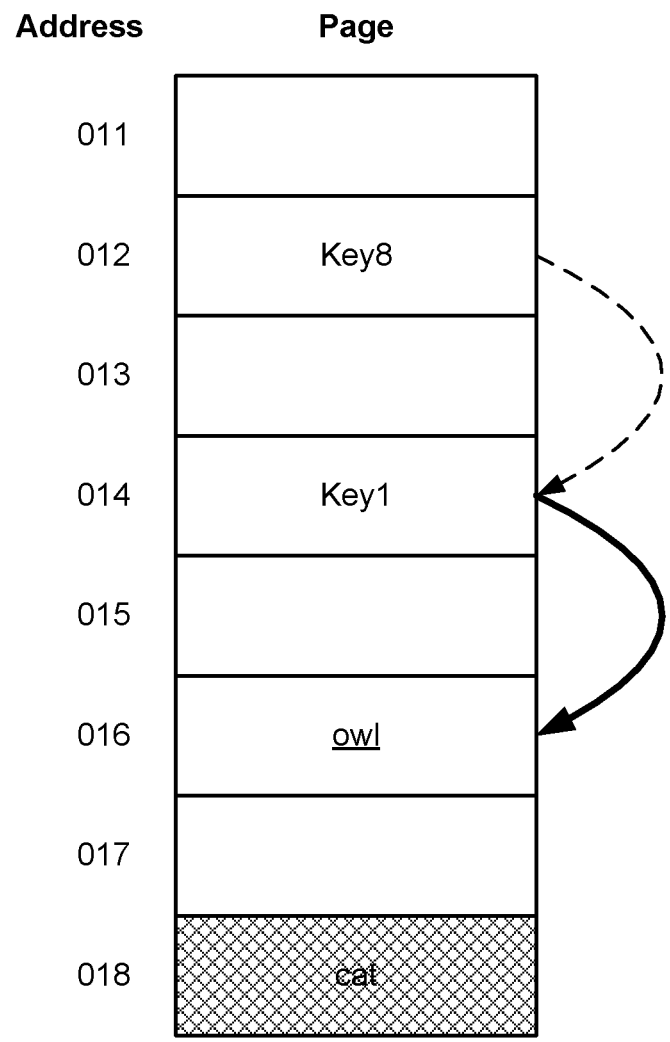
FIG. 12 shows an example of the result of using the put key operation to store a new value for a previously stored key in pages of the KVPM in the in-place update mode.
Figure 13:
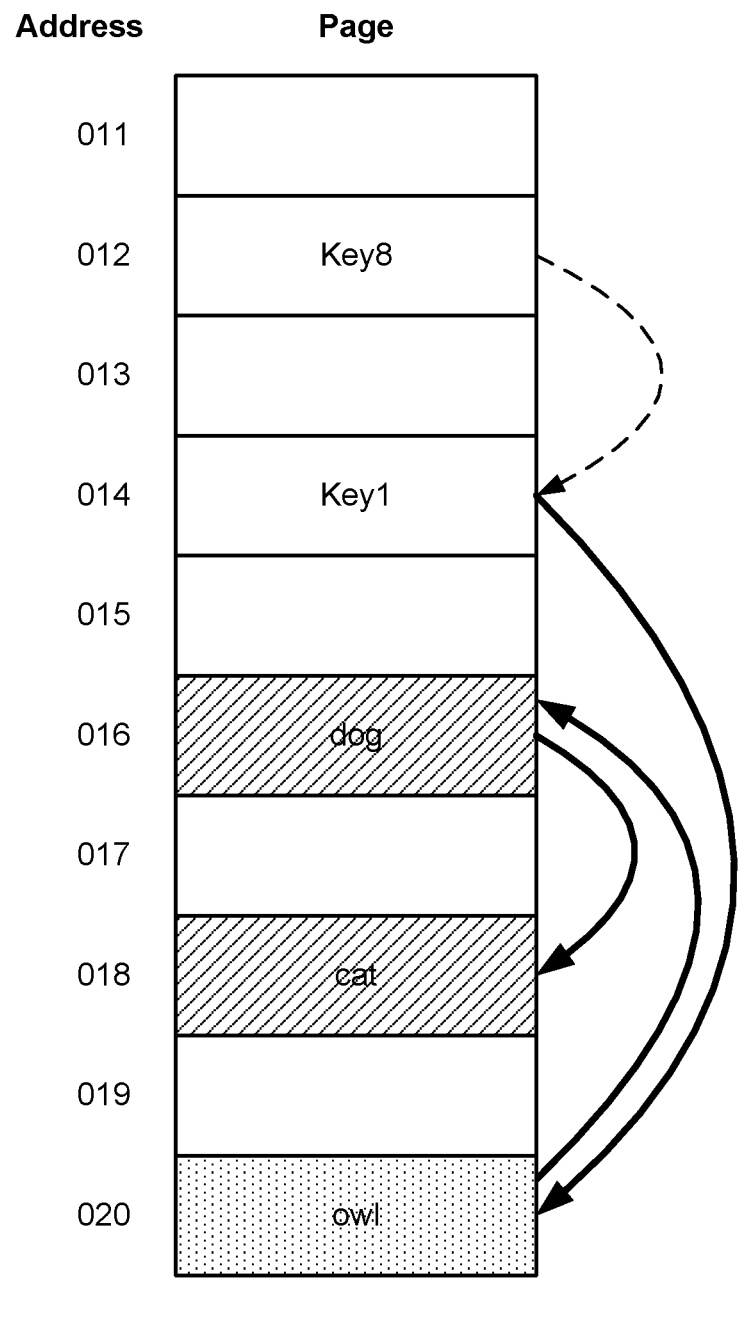
FIG. 13 shows an example of the result of using the put key operation to store a new value for a previously stored key in pages of the KVPM in the out-of-place update mode.

FIGS. 11, 12 and 13 describe examples of key-value pairs stored in pages of a KVPM using put key operations.

FIG. 11 shows an example of the result of using the put key operation to store a new key-value pair in pages of the KVPM. In the example of FIG. 11, a put key operation to store the new key-value pair of "Key1-dog,cat" is received (e.g., from an application). The key "Key1" is hashed to physical address "012" of the KVPM. When the page in KVPM associated with the physical address of "012" is checked for whether it is free, it is determined that the page is already used to store "Key8." As such, a hash collision is determined and a probe sequence that dictates, in this example, that the page that is two pages down (at "014") relative to the current page at "012" in the KVPM should be checked next. The page associated with physical address "014" is checked next and is determined to be free and so "Key1" is stored in that page. It is determined that two pages are needed to store the value "dog,cat" and so two unused pages are allocated for storing "dog,cat." In the example of FIG. 11, the allocated pages at the physical address of "016" and "018" are respectively used to store the "dog" and "cat" portions of the value. A pointer that points to the page that stores "dog" (the first value page, the page at physical address "016") is stored in the key page (the page at physical address "014"). A pointer that points to the page that stores "cat" (the second value page, the page at physical address "018") is stored in the page that stores "dog" (the first value page, the page at physical address "016"). The pages at physical addresses "016" and "018" that store "dog" and "cat" respectively are referred to as a value page chain. The page usage data structure may also be updated to indicate that previously unused pages at physical addresses "014," "016," and "018" are now used.

FIG. 12 shows an example of the result of using the put key operation to store a new value for a previously stored key in pages of the KVPM in the in-place update mode. After the key-value pair of FIG. 11 was successfully stored at the KVPM, another put key operation that includes the key-value pair of "Key1-owl" is received (e.g., from an application). It is determined that an in-place update is to be performed based on an appropriate mechanism. The key "Key1" is once again hashed to physical address "012" of the KVPM (using the same hashing function that was used in the example of FIG. 11). Again, when the page in KVPM associated with the physical address of "012" is checked for whether it is free, it is determined that the page is already used to store "Key8." Similarly, a probe sequence that dictates, in this example, that the page that is two pages down (at "014") relative to the current page at "012" in the KVPM should be checked next is followed. The page associated with physical address "014" is checked next and is determined that the page does include the expected key, "Key1."

Given that an in-place update is to be performed, the pointer stored in the key page at physical address "014" is read and used to identify the first key page at physical address "016." Storing the new value of "owl" requires only one page and so only the first key page at physical address "016" is overwritten with the new value of "owl." As such, the second key page at physical address "018" is no longer used and will be marked as unused in the page usage data structure. Further, the pointer to the value page at physical address "018" that was previously stored at the value page at physical address "016" (now storing "owl") is removed.

FIG. 13 shows an example of the result of using the put key operation to store a new value for a previously stored key in pages of the KVPM in the out-of-place update mode. After the key-value pair of FIG. 11 was successfully stored at the KVPM, another put key operation that includes the key-value pair of "Key1-owl" is received (e.g., from an application). It is determined that an out-of-place update is to be performed based on an appropriate mechanism. The key "Key1" is once again hashed to physical address "012" of the KVPM (using the same hashing function that was used in the example of FIG. 11). Again, when the page in KVPM associated with the physical address of "012" is checked for whether it is free, it is determined that the page is already used to store "Key8." Similarly, a probe sequence that dictates, in this example, that the page that is two pages down (at "014") relative to the current page at "012" in the KVPM should be checked next is followed. The page associated with physical address "014" is checked next and is determined that the page does include the expected key, "Key1."

Given that an out-of-place update is to be performed, it is determined that the new value of "owl" requires only one page and so one unused page of the KVPM is allocated to store "owl." In the example of FIG. 13, the page at physical address "020," which was previously unused, is allocated for storing "owl." Because an out-of-place update has occurred, "owl" is the current version of the value corresponding to key "Key1" and "dog,cat" is now a previous snapshot version of the value corresponding to key "Key1" that is still maintained. A pointer that points to the page that stores "owl" (the current version of the value, the page at physical address "020") is stored in the key page (the page at physical address "014") to replace the pointer that points to the page that stores "dog" (the first value page, the page at physical address "016")). Furthermore, a pointer that points to the page that stores "dog" (the first value page of the previous snapshot version of the key, the page at physical address "016") is stored in the current value page (the page at physical address "020"). In the example of FIG. 13, there is only one snapshot version for key "Key1" so it is referred to as "Snapshot version 1."

Figure 14:
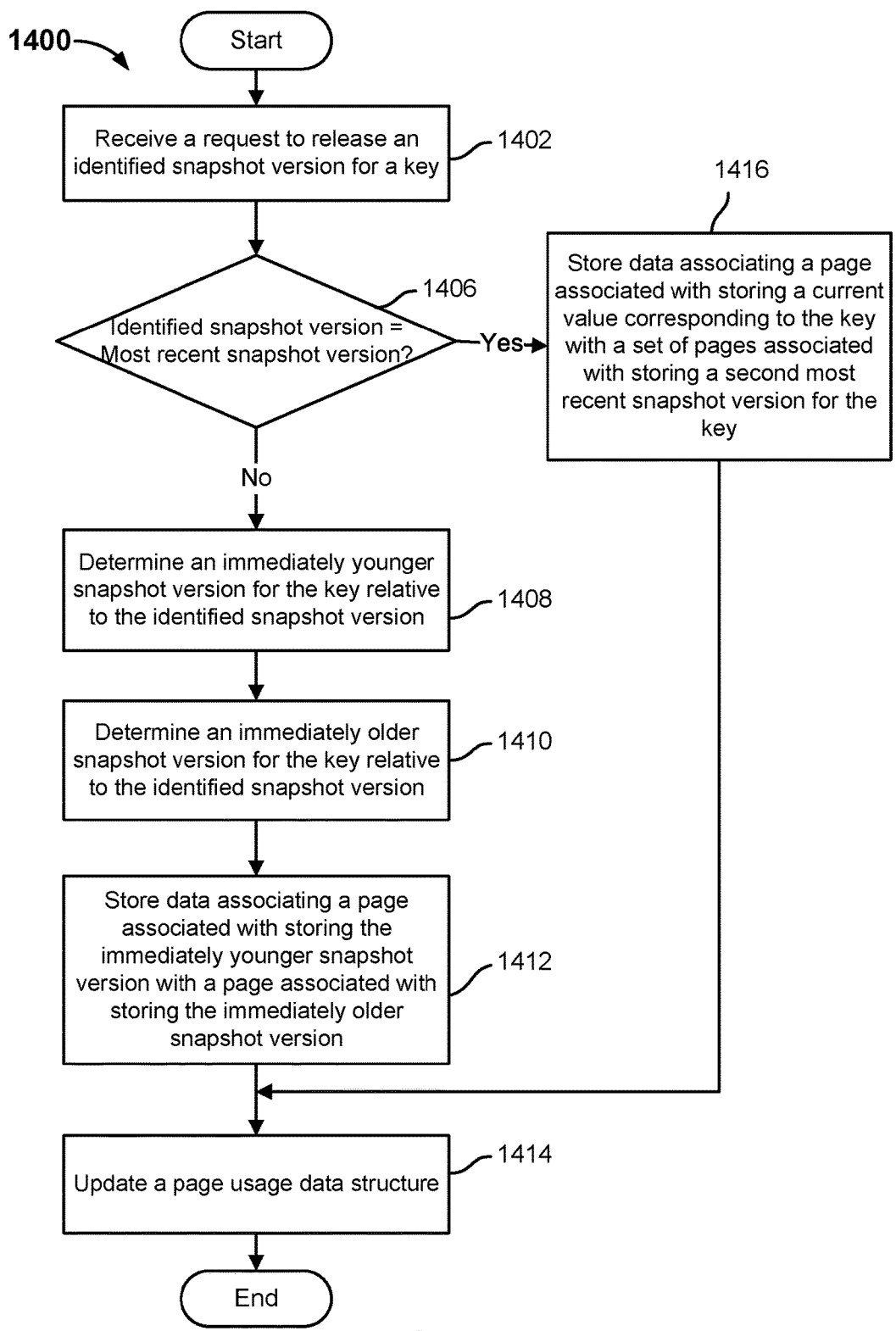
FIG. 14 is a flow diagram showing an embodiment of releasing a snapshot version of a value corresponding to a stored key.

Because each snapshot version of a value corresponding to the key points to an earlier snapshot version of the value, if any, the snapshot versions of the value corresponding to the key form a chain (e.g., a linked list) in the KVPM. Therefore, releasing a snapshot version is similar to deleting an element in a linked list. For example, a snapshot version may be selected to be released by a user or an application because it is no longer needed. The chain (linked list) of snapshot versions corresponding to the value of a key are walked through, the snapshot version that is immediately younger than (i.e., the snapshot version that was generated immediately later than) the to-be-released snapshot version is identified, and a pointer from that identified snapshot version is updated to point to the snapshot version that is immediately older than (i.e., the snapshot version that was generated immediately before) the to-be-released snapshot version. Afterwards, the pages occupied by the released snapshot version are released. FIG. 14, below, describes an example process of releasing an identified snapshot version.

FIG. 14 is a flow diagram showing an embodiment of releasing a snapshot version of a value corresponding to a stored key. In some embodiments, process 1400 is implemented at KVPM 304 of FIG. 3.

At 1402, a request to release an identified snapshot version for a key is received. A request to release an identified snapshot version of a value corresponding to a key is received. For example, the request may be received from an application.

At 1406, it is determined whether the identified snapshot version is the most recent snapshot version. In various embodiments, the most recent snapshot version is the version of the value that is immediately older than (i.e., the snapshot version that was generated immediately before) and pointed to by the value page chain that is storing the current value corresponding to the key. It is determined at 1406 whether the snapshot version to be released is the version of the value that is immediately older than and pointed to by the value page chain that is storing the current value corresponding to the key.

In the event that the identified snapshot version is the most recent snapshot version, control is transferred to 1416. At 1416, data associating a page associated with storing a current value corresponding to the key with a set of pages associated with storing a second most recent snapshot version for the key is stored. Given that the snapshot version to be released is the version of the value that is immediately older than and pointed to by the value page chain that is storing the current value corresponding to the key, a pointer that points to the value page chain associated with storing the snapshot version that is immediately older than the identified snapshot version is stored in the current value page chain.

At 1408, a first snapshot version for the key that comprises an immediately younger snapshot version for the key relative to the identified snapshot version is determined. The snapshot version that is immediately younger than (i.e., the snapshot version that was generated immediately later than) and points to the identified snapshot version is determined.

At 1410, a second snapshot version for the key that comprises an immediately older snapshot version for the key relative to the identified snapshot version is determined. The snapshot version that is immediately older than and is pointed to by the identified snapshot version is determined.

At 1412, data associating a page associated with storing the immediately younger snapshot version with a page associated with storing the immediately older snapshot version for the key is stored. The page in the value page chain that stores the snapshot version that is immediately younger than the identified snapshot version is updated to point to the value page chain that stores the snapshot version that is immediately older than the identified snapshot version.

At 1414, a page usage data structure is updated to free one or more pages that are associated with storing the identified snapshot version.

Figure 15:
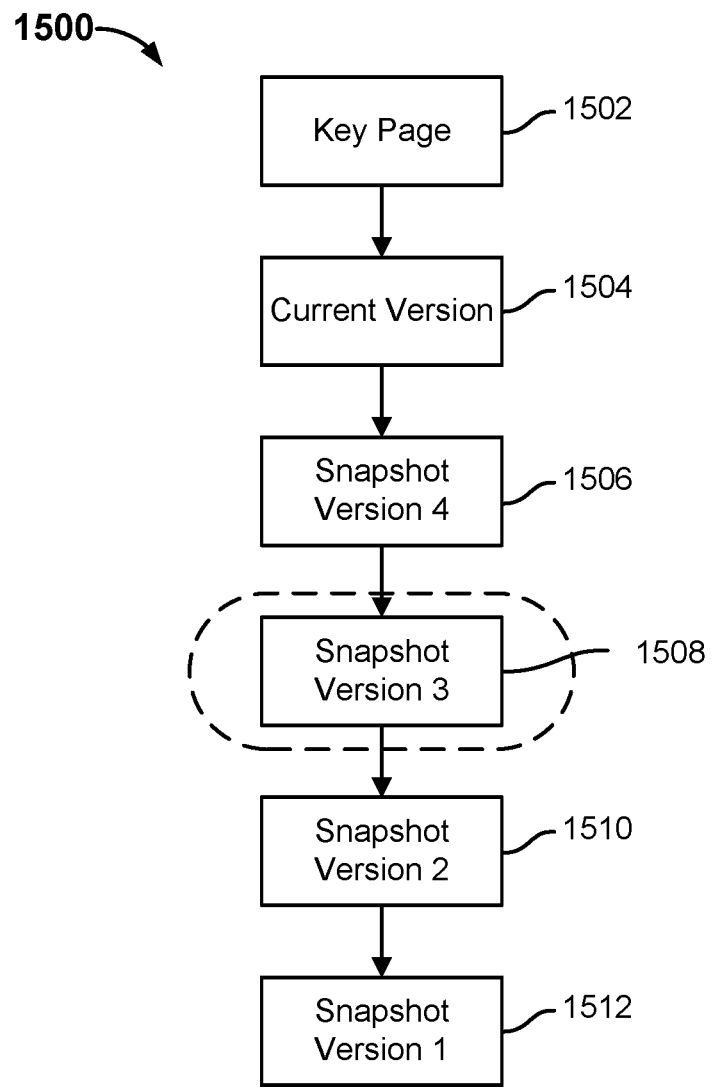
FIG. 15 shows an example of pointers between a key page and value pages associated with storing various versions of the value corresponding to a key.
Figure 16:
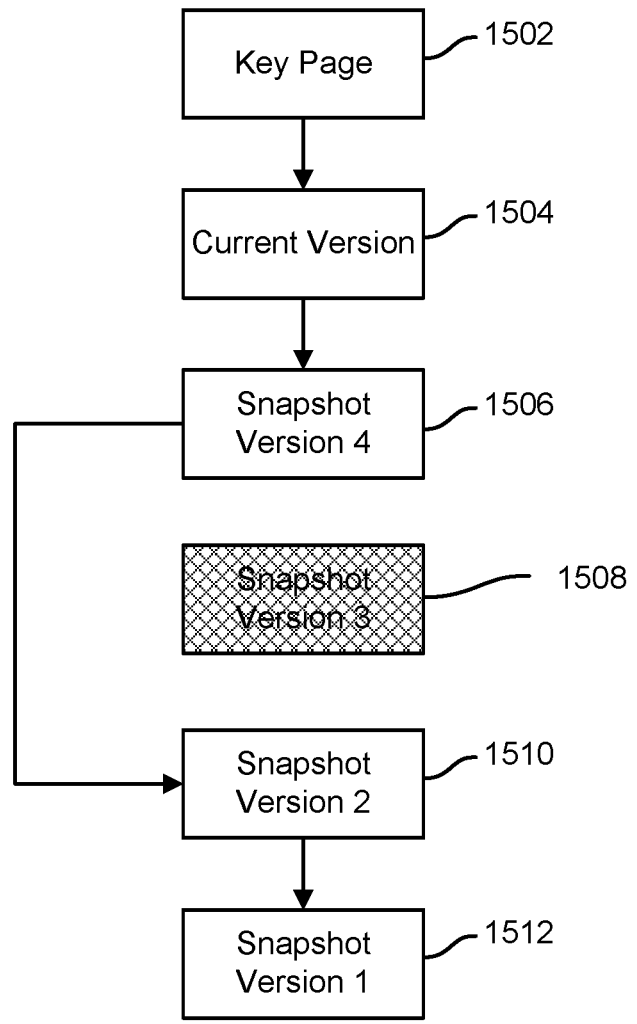
FIG. 16 shows an example of releasing a snapshot version of a value corresponding to a key.
Figure 16:

FIGS. 15 and 16 show examples of releasing a snapshot version of a value corresponding to a key.

FIG. 15 shows an example of pointers between a key page and value pages associated with storing various versions of the value corresponding to a key. As shown in FIG. 15, series of pages 1500 is a set of pages that stores a key and multiple versions of values that correspond to that key. Key page 1502 in the KVPM is shown to point to the page(s) in the KVPM that are associated with storing current version 1504 of the value corresponding to the key stored in key page 1502. The page(s) in the KVPM that store current version 1504 of the value corresponding to the key stored in key page 1502 then point to the page(s) in the KVPM that are associated with storing snapshot version 4 1506, which is the snapshot version that is immediately older than current version 1504, of the value corresponding to the key stored in key page 1502. The page(s) in the KVPM that store snapshot version 4 1506 of the value corresponding to the key stored in key page 1502 then point to the page(s) in the KVPM that are associated with storing snapshot version 3 1508, which is the snapshot version that is immediately older than snapshot version 4 1506, of the value corresponding to the key stored in key page 1502. The page(s) in the KVPM that store snapshot version 3 1508 of the value corresponding to the key stored in key page 1502 then point to the page(s) in the KVPM that are associated with storing snapshot version 2 1510, which is the snapshot version that is immediately older than snapshot version 3 1508, of the value corresponding to the key stored in key page 1502. The page(s) in the KVPM that store snapshot version 2 1510 of the value corresponding to the key stored in key page 1502 then point to the page(s) in the KVPM that are associated with storing snapshot version 1 1512, which is the snapshot version that is immediately older than snapshot version 2 1510, of the value corresponding to the key stored in key page 1502.

In the examples of FIGS. 15 and 16, snapshot version 3 1508 is to be released. For example, a request to remove snapshot version 3 1508 is received from an application.

FIG. 16 shows an example of releasing a snapshot version of a value corresponding to a key. Applying a process such as process 1400 of FIG. 14, snapshot version 3 1508 may be released by identifying the snapshot version that is immediately older than snapshot version 3 1508, identifying the snapshot version that is immediately younger than snapshot version 3 1508, and updating the pointer from snapshot version 4 1506 to point to the page(s) of snapshot version 2

1510 (instead of the pages of snapshot version 3 1508). In addition, the page(s) in the KVPM that are associated with storing snapshot version 3 1508 of the value corresponding to the key are marked as unused at the page usage data structure. Therefore, to remove snapshot version 3 1508, the linked list of pages in the KVPM that store various snapshot versions of a value corresponding to a key is modified to no longer point to the removed snapshot version 3 1508.

Figure 17:
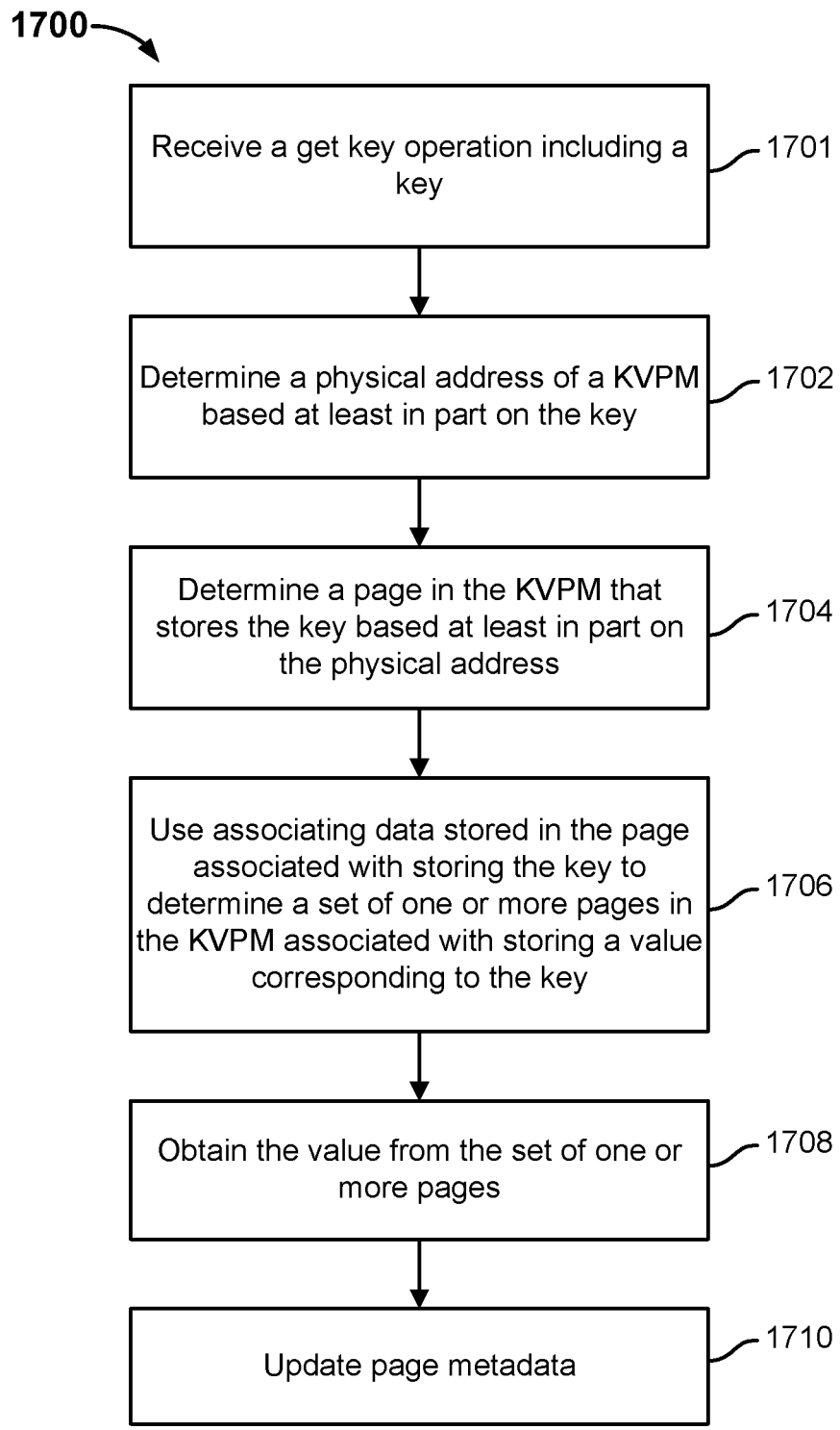
FIG. 17 is a flow diagram showing an embodiment of a process for retrieving from a KVPM a stored value corresponding to a key.

FIG. 17 is a flow diagram showing an embodiment of a process for retrieving from a KVPM a stored value corresponding to a key. In some embodiments, process 1700 is implemented at KVPM 304 of FIG. 3. In some embodiments, process 410 of FIG. 4B or steps 428 and 430 of process 420 of FIG. 4C are implemented at least in part using process 1700.

At 1701, a get key operation including a key is received. For example, the get key operation is received from an application. In process 1700, the received get key operation is configured to retrieve from the KVPM a stored value corresponding to a given key.

At 1702, a physical address of a KVPM is determined based at least in part on the key. In various embodiments, a hash function (e.g., formula (1) above) is used to compute a physical address of the KVPM based on at least a portion of the key.

At 1704, a page in the KVPM that stores the key is determined based at least in part on the physical address. The page in the KVPM that is associated with the physical address that is determined by the hash function is first checked for whether it contains the key included in the put key operation. In some embodiments, the predetermined probe sequence (the same one that was used for storing the key in the put key operation) is used to select the next page to check for the key included in the get key operation, until the appropriate key page is located.

At 1706, associating data stored in the page associated with storing the key is used to determine a set of one or more pages in the KVPM associated with storing a value corresponding to the key. The pointer that points to the (first) page of the value page chain associated with storing the current version of the value is read from the OOB space of the key page and used to locate the value page chain associated with storing the current version of the value.

At 1708, the value is obtained from the set of one or more pages. The one or more pages of the value page chain that is used to store the value corresponding to the given key are read to retrieve the value.

At 1710, page metadata is updated. For example, statistics information that is stored in the key page describing the number of instances that the value corresponding to the key is read (or written) is updated.

Figure 18:
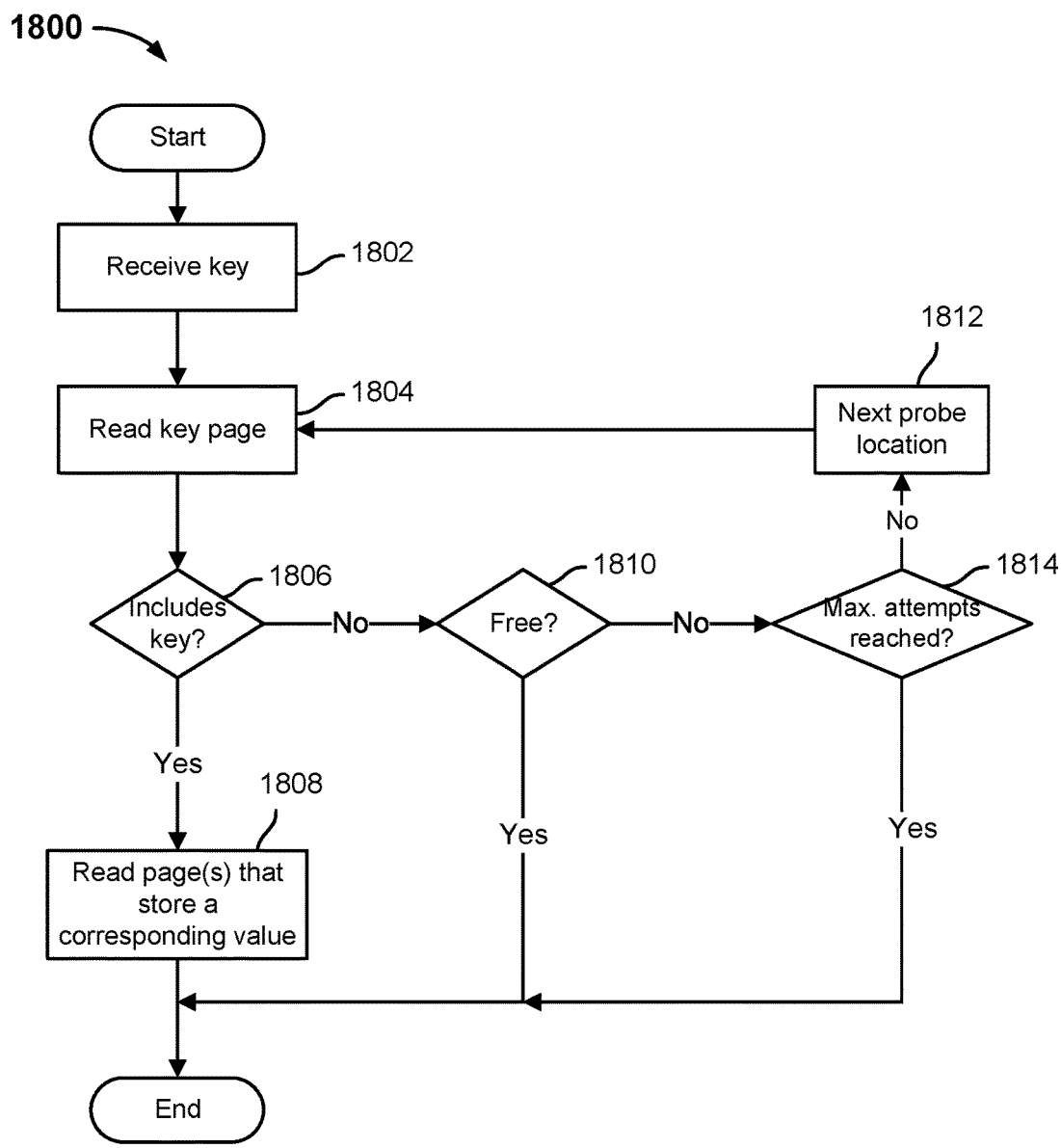
FIG. 18 is a flow diagram showing an example of a process for performing a get key operation.

FIG. 18 is a flow diagram showing an example of a process for performing a get key operation. In some embodiments, process 1800 is implemented at KVPM 304 of FIG. 3. In some embodiments, process 410 of FIG. 4B or steps 428 and 430 of process 420 of FIG. 4C are implemented at least in part using process 1800. In some embodiments, process 1700 of FIG. 17 may be implemented at least in part using process 1800.

At 1802, a key is received. A key is received in a get key operation (e.g., from an application).

At 1804, a page is read for the key. In various embodiments, a hash function (e.g., formula (1) above) is used to compute a physical address of the KVPM based on at least a portion of the key. The page of the KVPM associated with the hashed-to physical address is read to check for the key.

At 1806, it is determined whether the page includes the key. The determined physical address of the KVPM is read to determine whether the key is stored in that page. In the event that the key is not stored in that page, control is transferred to 1810. Otherwise, in the event that the key is stored in that page, control is transferred to 1808.

At 1808, page(s) that store a corresponding value are read. The OOB space of the key page is read for the pointer to the (first page of the) value page chain associated with storing the current version of the value corresponding to the given key of the get key operation.

At 1810, it is determined whether the page is free. In the event that the page that is checked for the key does not include the key and is also not free (e.g., the page stores another key), then a hash collision may have occurred and a predetermined probe sequence is used to determine the next page in the KVPM to check. In various embodiments, the same predetermined probe sequence is used to locate the key page in the get key operation that was used to store the key in the put key operation. At 1814, it is determined whether a maximum number of attempts of the probe sequence has been reached. In some embodiments, a maximum on the number of attempts of the probe sequence (e.g., five attempts) may be established to determine when to return a failure message in response to the get key operation. In the event that it is determined that the maximum number of attempts of the probe sequence has not been reached, then a next probe location (e.g., a next page of the KVPM) is checked for the key at 1812 and control is then returned to 1804. In the event that it is determined that the maximum number of attempts of the probe sequence has been reached, process 1800 ends and a failure message is optionally returned to the entity (e.g., application) from which the get key operation was received. In the event that the page that is checked for the key does not include the key but is free, process 1800 ends and a failure message is optionally returned to the entity (e.g., application) from which the get key operation was received.

Figure 19:
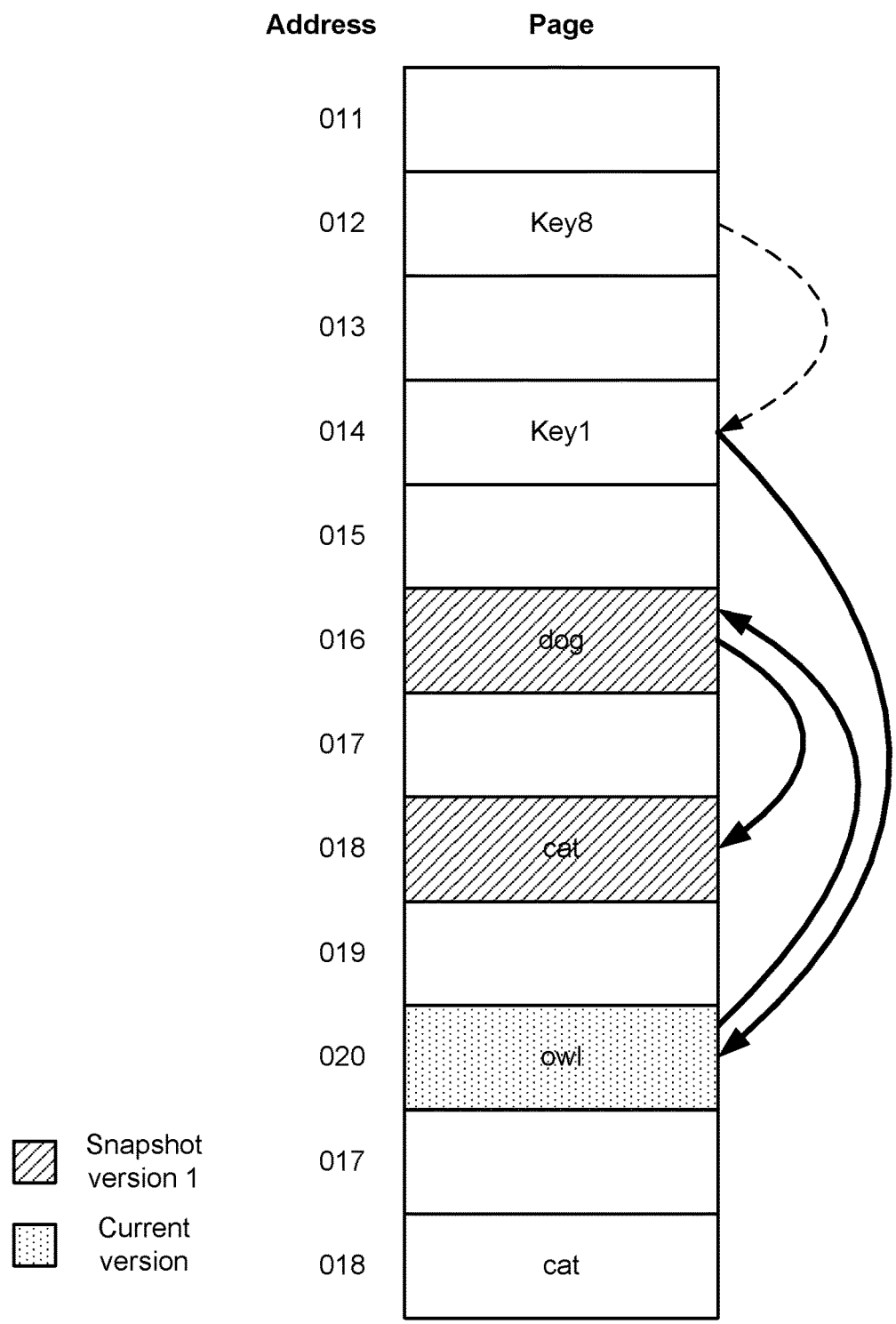
FIG. 19 shows an example of the result of using the get key operation to retrieve from the pages of a KVPM a stored value corresponding to a given key.

FIG. 19 shows an example of the result of using the get key operation to retrieve from the pages of a KVPM a stored value corresponding to a given key. In the example of FIG. 19, a get key operation to retrieve the current version of the value corresponding to a given key, "Key1," is received (e.g., from an application). The key "Key1" is hashed to physical address "012" of the KVPM. When the page in KVPM associated with the physical address of "012" is checked for whether it is free, it is determined that the page is already used to store "Key8." As such, a hash collision is determined and a probe sequence that dictates, in this example, that the page that is two pages down (at "014") relative to the current page at "012" in the KVPM should be checked next. The page associated with physical address "014" is checked next and is determined to store "Key1" so the page associated with physical address "014" is identified as the key page. The pointer to the page associated with the current version of the value is read from the OOB space of the key page. This pointer points to the page associated with physical address "020" and so the value "owl" is read from the page associated with physical address "020" and returned to the requesting application. While Snapshot version 1 of the value corresponding to "Key1" is not requested by the get key operation, it is noted that the pages that store Snapshot version 1 of the value may be received, when requested, via a pointer stored in the OOB space of the page associated with physical address "020."

It should be mentioned that the get key operation can be used to retrieve snapshot versions as well. The API can be extended with an optional version number argument to specify which snapshot version to be retrieved. If the version number is absent (not specified), the default servicing of the operation is to retrieve the current version.

As described above, in KVPM, applications access data with keys directly, without the need of calculating LBAs from keys and/or mapping an LBA to a PBA. Furthermore, KVPM's ability to perform in-place update results in simple address mapping; a key from an application can be easily mapped to a memory page on a persistent storage media device and there is no need to maintain complex, expensive indirection system like in Flash-based SSD (e.g., Flash Translation Layer and Logical-to-Physical table). In addition, there is no need for compaction or garbage collection, which reduces overhead and read/write amplification. Unlike Flash-based SSD storage, key-value records are stored in KVPM directly so there are no multiple levels of files, and no wasted space caused by duplicated data. Various embodiments described herein also provide native, fine-grained, and on-demand snapshotting. When updating an existing key-value record, a new value can be either updated in-place if the previous version is no longer needed, or it can be written to newly allocated pages with a link to the previous version. Whether to perform an update in-place or out-of-place may be determined dynamically at runtime and at a per-key basis. This not only reduces overhead from software-based snapshotting, but also avoids wasted space from unnecessary snapshot copies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, using a processor, a put key operation including a key and a corresponding value;
directly storing the key at a persistent memory media using a physical address that is determined based at least in part on the key, wherein the persistent memory media supports memory persistence and in-place updating; and
directly storing the value at the persistent memory media, wherein directly storing the key to the persistent memory media using the physical address that is determined based at least in part on the key comprises:
determining that a page associated with the physical address in the persistent memory media is unused;
storing the key at the page associated with the physical address in the persistent memory media; and
storing associating data between the page associated with the physical address in the persistent memory media associated with storing the key and a set of pages in the persistent memory media associated with storing the value.

2. The method of claim 1, wherein directly storing the key to the persistent memory media comprises determining the physical address without requiring a translation of a logical address associated with the key to the physical address.

3. The method of claim 1, wherein directly storing the key to the persistent memory media comprises determining the physical address based at least in part on hashing at least a portion of the key to the physical address.

4. The method of claim 1, wherein the put key operation comprises a first put key operation, the key comprises a first key, the value comprises a first value, the physical address comprises a first physical address, and the method further comprising:
performing a second put key operation, including:
obtaining a second key and a corresponding second value;
directly storing the second key at the persistent memory media using a second physical address that is determined based at least in part on the second key; and
directly storing the value at the persistent memory media, wherein directly storing the second key to the persistent memory media using the second physical address that is determined based at least in part on the second key comprises:
determining that a page associated with the second physical address in the persistent memory media stores another key;
selecting a new page in the persistent memory media based at least in part on a probe sequence;
determining that the new page in the persistent memory media is unused;
storing the second key at the new page in the persistent memory media; and
storing associating data between the new page in the persistent memory media associated with storing the second key and a set of pages in the persistent memory media associated with storing the second value.

5. The method of claim 1, wherein the put key operation comprises a first put key operation, wherein the value comprises a previous value, and further comprising:
performing a second put key operation, including:
obtaining the key and a corresponding new value;
in response to a determination that the page associated with the physical address in the persistent memory media stores the key, determining to perform an in-place update; and
overwriting, with the new value, at least a portion of the set of pages in the persistent memory media associated with storing the previous value.

6. The method of claim 1, wherein the put key operation comprises a first put key operation, wherein the value comprises a previous value, wherein the set of pages comprises a previous set of pages in the persistent memory media, and further comprising:
performing a second put key operation, including:
obtaining the key and a corresponding new value;
in response to a determination that the page associated with the physical address in the persistent memory media stores the key, determining to perform an out-of-place update;
writing the new value in a new set of pages in the persistent memory media;
storing associating data between the page associated with the physical address in the persistent memory media and the new set of pages in the persistent memory media; and
storing associating data between the new set of pages in the persistent memory media and the previous set of pages in the persistent memory media.

7. The method of claim 1, further comprising:
receiving a request to release an identified snapshot version for the key;
determining an immediately younger snapshot version for the key relative to the identified snapshot version;
determining an immediately older snapshot version for the key relative to the identified snapshot version;

storing data associating one or more pages in the persistent memory media associated with storing the immediately younger snapshot version with one or more pages in the persistent memory media associated with storing the immediately older snapshot version; and updating a page usage data structure to indicate that one or more pages in the persistent memory media associated with storing the identified snapshot version are unused.

8. A method, comprising:

receiving, using a processor, a get key operation including a key; and directly accessing a persistent memory media using a physical address that is determined based at least in part on the key to retrieve a stored value corresponding to the key, wherein the persistent memory media supports memory persistence and in-place updating, wherein directly accessing the persistent memory media using the physical address that is determined based at least in part on the key to retrieve the stored value that corresponds to the key comprises:

determining that a page associated with the physical address in the persistent memory media stores the key; and using associating data stored in the page associated with the physical address in the persistent memory media that stores the key to determine a set of pages in the persistent memory media at which the value is stored.

9. A system, comprising:

a persistent memory media that supports memory persistence and in-place updating; and a processor coupled to the persistent memory media, configured to:

perform a put key operation, including to:

obtain a key and a corresponding value;

directly store the key at the persistent memory media using a physical address that is determined based at least in part on the key; and directly store the value at the persistent memory media, wherein to directly store the key to the persistent memory media using the physical address that is determined based at least in part on the key comprises to:

determine that a page associated with the physical address in the persistent memory media is unused;

store the key at the page associated with the physical address in the persistent memory media; and store associating data between the page associated with the physical address in the persistent memory media associated with storing the key and a set of pages in the persistent memory media associated with storing the value.

10. The system of claim 1, wherein the processor is further configured to:

generate a page usage data structure at boot time; and dynamically update the page usage data structure in response to updates in page allocation in the persistent memory media during runtime.

11. The system of claim 1, wherein to directly store the key to the persistent memory media comprises to determine the physical address without requiring a translation of a logical address associated with the key to the physical address.

12. The system of claim 1, wherein to directly store the key to the persistent memory media comprises to determine the physical address based at least in part on hashing at least a portion of the key to the physical address.

13. The system of claim 1, wherein the put key operation comprises a first put key operation, the key comprises a first key, the value comprises a first value, the physical address comprises a first physical address, and the processor is further configured to:

perform a second put key operation, including to:

obtain a second key and a corresponding second value;

directly store the second key at the persistent memory media using a second physical address that is determined based at least in part on the second key; and directly store the value at the persistent memory media, wherein to directly store the second key to the persistent memory media using the second physical address that is determined based at least in part on the second key comprises to:

determine that a page associated with the second physical address in the persistent memory media stores another key;

select a new page in the persistent memory media based at least in part on a probe sequence;

determine that the new page in the persistent memory media is unused;

store the second key at the new page in the persistent memory media; and store associating data between the new page in the persistent memory media associated with storing the second key and a set of pages in the persistent memory media associated with storing the second value.

14. The system of claim 1, wherein the put key operation comprises a first put key operation, wherein the value comprises a previous value, and wherein the processor is further configured to:

perform a second put key operation, including to:

obtain the key and a corresponding new value;

in response to a determination that the page associated with the physical address in the persistent memory media stores the key, determine to perform an in-place update; and overwrite, with the new value, at least a portion of the set of pages in the persistent memory media associated with storing the previous value.

15. The system of claim 1, wherein the put key operation comprises a first put key operation, wherein the value comprises a previous value, wherein the set of pages comprises a previous set of pages in the persistent memory media, and wherein the processor is further configured to:

perform a second put key operation, including to:

obtain the key and a corresponding new value;

in response to a determination that a page associated with the physical address in the persistent memory media stores the key, determine to perform an out-of-place update;

write the new value in a new set of pages in the persistent memory media;

store associating data between the page associated with the physical address in the persistent memory media and the new set of pages in the persistent memory media; and store associating data between the new set of pages in the persistent memory media and the previous set of pages in the persistent memory media.

16. The system of claim 1, wherein the processor is further configured to:
- receive a request to release an identified snapshot version for the key;
- determine an immediately younger snapshot version for the key relative to the identified snapshot version;
- determine an immediately older snapshot version for the key relative to the identified snapshot version;
- store data associating one or more pages in the persistent memory media associated with storing the immediately younger snapshot version with one or more pages in the persistent memory media associated with storing the immediately older snapshot version; and
- update a page usage data structure to indicate that one or more pages in the persistent memory media associated with storing the identified snapshot version are unused.

17. A system, comprising:
- a persistent memory media that supports memory persistence and in-place updating; and
- a processor coupled to the persistent memory media, configured to:
  - perform a get key operation, including to:
    - obtain a key; and
    - directly access the persistent memory media using a physical address that is determined based at least in part on the key to retrieve a stored value corresponding to the key, wherein to directly access the persistent memory media using the physical address that is determined based at least in part on the key to retrieve the stored value that corresponds to the key comprises to:
      - determine that a page associated with the physical address in the persistent memory media stores the key; and
      - use associating data stored in the page associated with the physical address in the persistent memory media that stores the key to determine a set of pages in the persistent memory media at which the value is stored.

18. The system of claim 17, wherein to directly access the persistent memory media comprises to determine the physical address without requiring a translation of a logical address associated with the key to the physical address.

19. The system of claim 17, wherein the processor is further configured to determine the physical address based at least in part on hashing at least a portion of the key to the physical address.

20. A computer program product, the computer program product being embodied in a non-transitory computer readable storage medium and comprising computer instructions for:
- receiving a put key operation including a key and a corresponding value;
- directly storing the key at a persistent memory media using a physical address that is determined based at least in part on the key, wherein the persistent memory media supports memory persistence and in-place updating; and
- directly storing the value at the persistent memory media, wherein directly storing the key to the persistent memory media using the physical address that is determined based at least in part on the key comprises:
  - determining that a page associated with the physical address in the persistent memory media is unused;
  - storing the key at the page associated with the physical address in the persistent memory media; and
  - storing associating data between the page associated with the physical address in the persistent memory media associated with storing the key and a set of pages in the persistent memory media associated with storing the value.

21. A computer program product, the computer program product being embodied in a non-transitory computer readable storage medium and comprising computer instructions for:
- receiving a get key operation including a key; and
- directly accessing a persistent memory media using a physical address that is determined based at least in part on the key to retrieve a stored value corresponding to the key, wherein the persistent memory media supports memory persistence and in-place updating, wherein directly accessing the persistent memory media using the physical address that is determined based at least in part on the key to retrieve the stored value that corresponds to the key comprises:
  - determining that a page associated with the physical address in the persistent memory media stores the key; and
  - using associating data stored in the page associated with the physical address in the persistent memory media that stores the key to determine a set of pages in the persistent memory media at which the value is stored.

* * * * *